United States Patent [19]
Torgrim et al.

[11] Patent Number: 4,809,272
[45] Date of Patent: Feb. 28, 1989

[54] TELEPHONE SWITCHING SYSTEM WITH VOICE DETECTION AND ANSWER SUPERVISION

[75] Inventors: Willard J. Torgrim, Batavia; Robert M. Zuranski, Woodridge, both of Ill.

[73] Assignee: Rockwell International Corporation, El Segundo, Calif.

[21] Appl. No.: 909,549

[22] Filed: Sep. 22, 1986

[51] Int. Cl.[4] .................... G06G 7/19; H04M 3/00
[52] U.S. Cl. .................... 370/110.3; 379/386
[58] Field of Search .................... 370/110.1, 110.3; 379/386, 351, 257

[56] References Cited

U.S. PATENT DOCUMENTS

| | | | |
|---|---|---|---|
| 4,439,639 | 3/1984 | Munter | 370/110.3 |
| 4,504,947 | 3/1985 | Perry | 370/110.1 |
| 4,519,072 | 5/1985 | Fechalos et al. | 370/110.3 |
| 4,623,760 | 11/1986 | Binkerd et al. | 370/110.1 |
| 4,689,760 | 8/1987 | Lee et al. | 370/110.3 |

Primary Examiner—Douglas W. Olms
Assistant Examiner—Melvin Marcelo
Attorney, Agent, or Firm—C. B. Patti; V. L. Sewell; H. F. Hamann

[57] ABSTRACT

An answer detector receives first and second control signals from an automatic calling distribution system. The first and second control signals are latched for further use by the answer detector. An address decode circuit receives address signals from the automatic calling distribution system. Furthermore, a pulse code modulated (PCM) data stream and a clock signal is received from the automatic calling distribution system. The PCM data stream is converted from a serial format to a parallel format and held in a data latch.

A processor in the answer detector in response to the first and second control signals monitors the PCM data stream for tone and voice energy. Through this analysis made by the processor, the answer detector responds to any of seven conditions: ringback tone, voice, tritone, busy tone, reorder tone, dial tone and a no response status. The processor places the proper response in an output buffer which is transmitted by an output signalling circuit back to the automatic calling distribution system.

10 Claims, 28 Drawing Sheets

| EVENT | AD ACTION | XMIT SIGNAL FROM AD | | ACD RESPONSE | RCV SIGNAL TO AD | | SEE FIGURE |
|---|---|---|---|---|---|---|---|
| | | A | B | | A | B | |
| SEIZURE | PUT IN SERVICE | 0 | 0 | REQUEST AD SERVICE | 0 | 1 | 4-10 |
| VOICE | REPORT VOICE | 1 | 0 | QUEUE TO GATE RELEASE AD | 0 | 0 | 4 |
| TELCO TRITONE | REPORT TRITONE | 0 | 1 | TERMINATE CALL RELEASE AD | 0 | 0 | 5 |
| RINGBACK TONE[a] | REPORT RINGBACK | 1 | 1 | EXPECT 70ms MIN. | 0 | 1 | 5,4,10 |
| REORDER TONE | REPORT REORDER | 0 | 1 | TERMINATE CALL RELEASE AD | 0 | 0 | 7 |
| BUSY TONE | REPORT BUSY | 1 | 1 | TERMINATE CALL RELEASE AD | 0 | 0 | 6 |
| TRANSITION[b] BUSY/REORDER | REPORT TRANSITION | 1 | 0 | EXPECT 70ms MIN. | 0 | 1 | 6,7 |
| DIAL TONE | REPORT DIAL | 0 | 1 | RELEASE AD | 0 | 0 | 8 |
| AD DOES NOT RESPONSE TO SEIZURE | REPORT IDLE | 0 | 0 | REQUEST AD TO TEST ITSELF | 1 | 1 | 9 |
| REQUEST AD TO TEST ITSELF | REPORT TEST COMPLETE | 1 | 1 | PUT IN SERVICE | 0 | 0 | 9 |
| | REPORT IDLE | 0 | 0 | PUT OUT OF SERVICE | 1 | 1 | |

[a] RINGBACK IS A TRANSITION STATE (11) BEFORE VOICE OR TRITONE IS REPORTED. THE ACD EXPECTS TO SEE THIS TRANSITION CODE FOR 70ms MIN. IT IS SENT FOR 80ms MIN.

[b] A TRANSITION CODE (10) IS SENT FROM THE AD WHILE IT DECIDES IF THE TONE IS BUSY OR REORDER. THE CODE IS SENT FOR 300ms MIN.

FIG. 3a

| TONE TYPE | FREQUENCY | | | LEVEL (dBM) |
|---|---|---|---|---|
| | PRECISE (HZ ± 1.5%) | ON/OFF (SEC) | NON PRECISE (HZ ± 1.5%) | |
| RINGBACK | 440 + 480 | 2/4 | - | -50 TO -3 |
| DIAL | 350 + 440 | CONTINUOUS | - | -50 TO -3 |
| REORDER | 480 + 620 | 0.3/0.2 | 600 MODULATED BY 120 | -50 TO -3 |
| BUSY | 480 + 620 | 0.5/0.5 | 600 MODULATED BY 120 | -50 TO -3 |
| TRITONE | 913.8 OR 985.2 1370.6 OR 1428.5 1770.7 | 274ms OR 380ms ±5 | - | -48 TO -3 |
| VOICE | 300 - 300 | - | - | -50 TO -3 |

*FIG. 3b*

INITIAL INTERMEDIATE FINAL

A - ACD SEIZES AD AND CONNECTS TRUNK

B - AD DETECTS RINGBACK GUARANTEEING TRANSITION STATE FOR 80ms MIN

C - ACD VERIFIES RINGBACK TRANSITION (80 msec)

D - AD DETECTS VOICE ANSWER

E - ACD VERIFIES VOICE ANSWER TRANSITION (70 msec) AND RELEASES AD

F - AD GOES IDLE AND IS READY FOR NEXT CALL

G - ACD VERIFIES TRANSITION (70 msec) AND PUTS AD AVAILABLE

A - ACD SEIZES AD AND CONNECTS TRUNK

B - AD DETECTS RINGBACK, GUARANTEEING TRANSITION STATE FOR 80ms MIN.

C - ACD VERIFIES RINGBACK TRANSITION (80 msec)

D - AD DETECTS TELCO TRI-TONE

E - ACD VERIFIES TELCO TRI-TONE TRANSITION (70 msec) AND RELEASES AD

F - AD GOES IDLE AND IS READY FOR NEXT CALL

G - ACD VERIFIES TRANSITION (70 msec) AND PUTS AD AVAILABLE

- A - ACD SEIZES AD AND CONNECTS TRUNK
- B - AD DETECTS BUSY OR REORDER TONE, GUARANTEEING TRANSITION STATE FOR 80ms MIN.
- C - ACD VERIFIES BUSY OR REORDER TRANSITION (80 msec)
- D - AD DETERMINES IT IS BUSY TONE
- E - ACD VERIFIES BUSY TONE TRANSITION (70 msec) AND RELEASES AD
- F - AD GOES IDLE AND IS READY FOR NEXT CALL
- G - ACD VERIFIES TRANSITION (70 msec) AND PUTS AD AVAILABLE

A - ACD SEIZES AD AND CONNECTS TRUNK

B - AD DETECTS BUSY OR REORDER TONE, GUARANTEEING TRANSITION STATE FOR 80 ms MIN.

D - AD DETERMINES IT IS REORDER TONE

E - ACD VERIFIES REORDER TONE TRANSITION AND RELEASES AD

F - AD GOES IDLE AND IS READY FOR NEXT CALL

A - ACD SEIZES AD AND CONNECTS TRUNK

B - AD DETECTS DIAL TONE

C - ACD VERIFIES DIAL TONE TRANSITION (70 msec) AND RELEASES AD

D - AD GOES IDLE AND IS READY FOR NEXT CALL

E - ACD VERIFIES TRANSITION (70 msec) AND PUTS AD AVAILABLE

A - ACD SEIZES AD AND CONNECTS TRUNK

B - NO AD RESPONSE, ACD RELEASES TRUNK AND REQUESTS FUNCTIONAL TEST

C - AD RESPONDS TO FUNCTIONAL TEST REQUEST

D - ACD VERIFIES FUNCTIONAL TEST TRANSITION (70 msec) AND RELEASES AD

E - AD GOES IDLE AND IS READY FOR NEXT CALL

F - ACD VERIFIES TRANSITION (70 msec) AND PUTS AD AVAILABLE

A - ACD SEIZES AD AND CONNECTS TRUNK

B - AD DETECTS RINGBACK

C - ACD VERIFIES RINGBACK TRANSITION (70 msec)

D - ACD RING TIMEOUT, TRUNK DROPPED, AD RELEASED

E - AD ACKNOWLEDGES RELEASE AND IS READY FOR NEXT CALL

F - ACD VERIFIES TRANSITION (70 msec) AND PUTS AD AVAILABLE

TELEPHONE SWITCHING SYSTEM WITH VOICE DETECTION AND ANSWER SUPERVISION

BACKGROUND OF THE INVENTION

The present invention relates to telephone switching systems and, in particular to systems with circuitry which can sense various tones and voice energies in a pulse code modulated (PCM) stream.

Telephone switching systems incorporating automatic call distribution, are well known in the prior art. These telephone switching systems are connected to telephone trunk lines over which telephone calls are sent and received in pulse code modulated form.

The present invention features voice detection and answer supervision. The present invention or answer detector is used by the automatic calling distribution system to sense ringback, dial, busy, reorder, tritone and voice energies. The answer detector monitors a telephone call and reports its progress to the automatic calling distribution system.

OBJECTS OF THE INVENTION

It is the object of the present invention to provide an improved answer detector and method of monitoring telephone calls for use by an automatic calling distribution system.

SUMMARY OF THE INVENTION

The present invention is an answer detector which received first and second control signals from an automatic calling distribution system. The first and second control signals are latched for further use by the answer detector. An address decode circuit receives address signals from the automatic calling distribution system. Furthermore, a pulse code modulated (PCM) data stream and a clock signal is received from the automatic calling distribution system. The PCM data stream is converted from a serial format to a parallel format and held in a data latch.

A processor in the answer detector in response to the first and second control signals monitors and PCM data stream for tone and voice energy. Through this analysis made by the processor, the answer detector responds to any of seven conditions: ringback tone, voice, tritone, busy tone, reorder tone, ringback time out and a no response status. The processor places the proper response in an output buffer which is transmitted by an output signalling circuit back to the automatic calling distribution system.

BRIEF DESCRIPTION OF THE DRAWINGS

The features of the present invention which are believed to be novel are set forth with particularity in the appended claims. The invention together with further objects and advantages may best be understood by reference to the following descriptions taken in conjunction with the accompanying drawings, in the several figures of which like reference numerals identify like elements, and in which:

FIGS. 3A and 3B are tables illustrating the types of action taken by the answer detector and the responses of the automatic call distribution system.

DESCRIPTION OF THE PREFERRED EMBODIMENTS

Figure 1A:
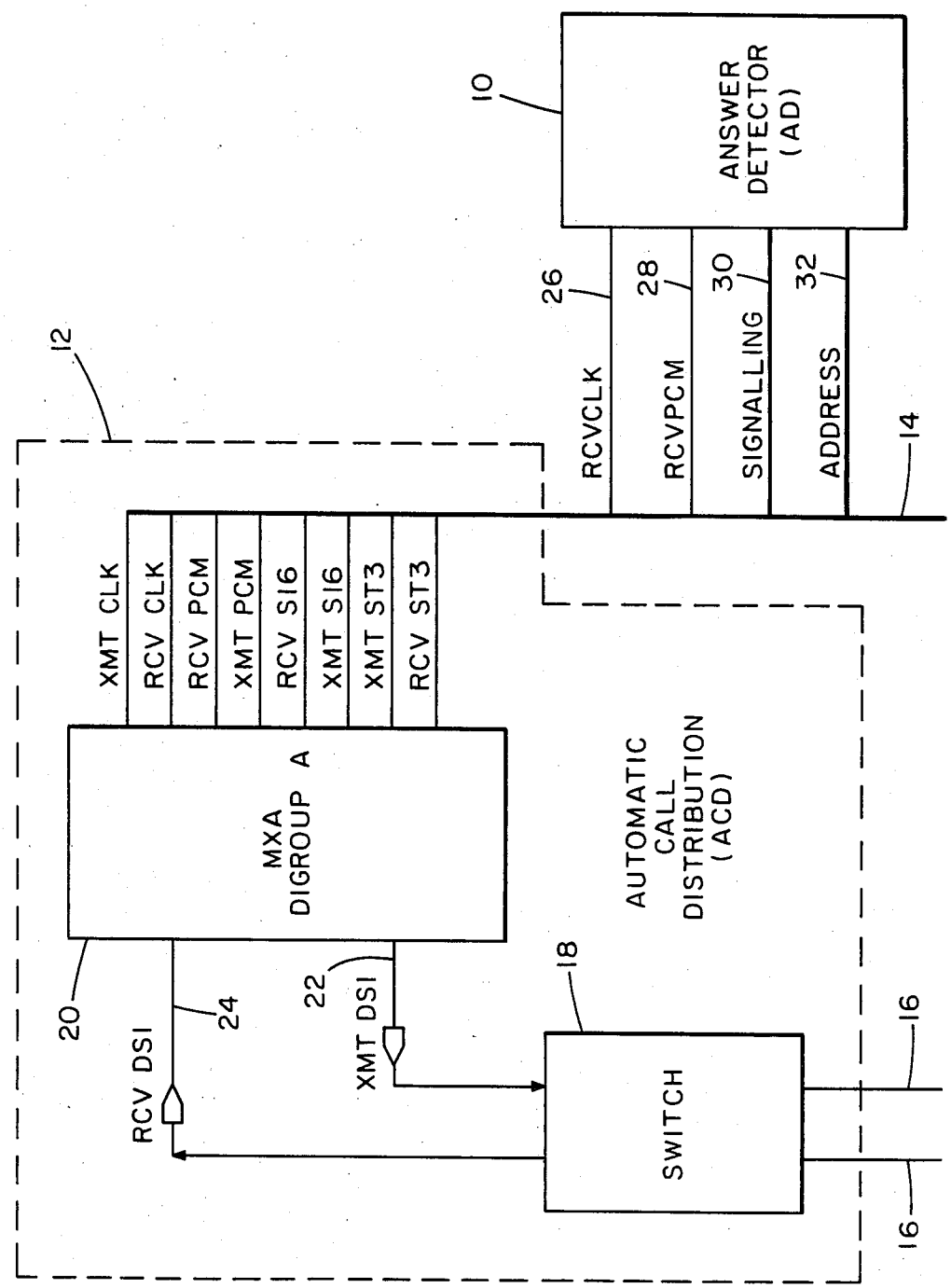
FIG. 1A is a general block diagram showing the connection of the answer detector to the automatic call distribution system.

FIG. 1A is a general block diagram showing the answer detector 10 connected to an automatic call distribution system 12 through a bus 14. The automatic call distribution system works to a plurality of telephone trunk lines 16. The switch 18, which is well known in the telephone art, signals the MXA 20 over transmit and receive lines 22 and 24, respectively. The MXA 20 provides the appropriate signals to the answer detector 10 through the bus 14 and received the response signals from the answer detector 10 through the bus 14. As shown in FIG. 1 the answer detector receives a clock signal on line 26, a PCM data stream on line 28, receive and transmit control signals on line 30, and address signals on line 32.

Figure 1B:
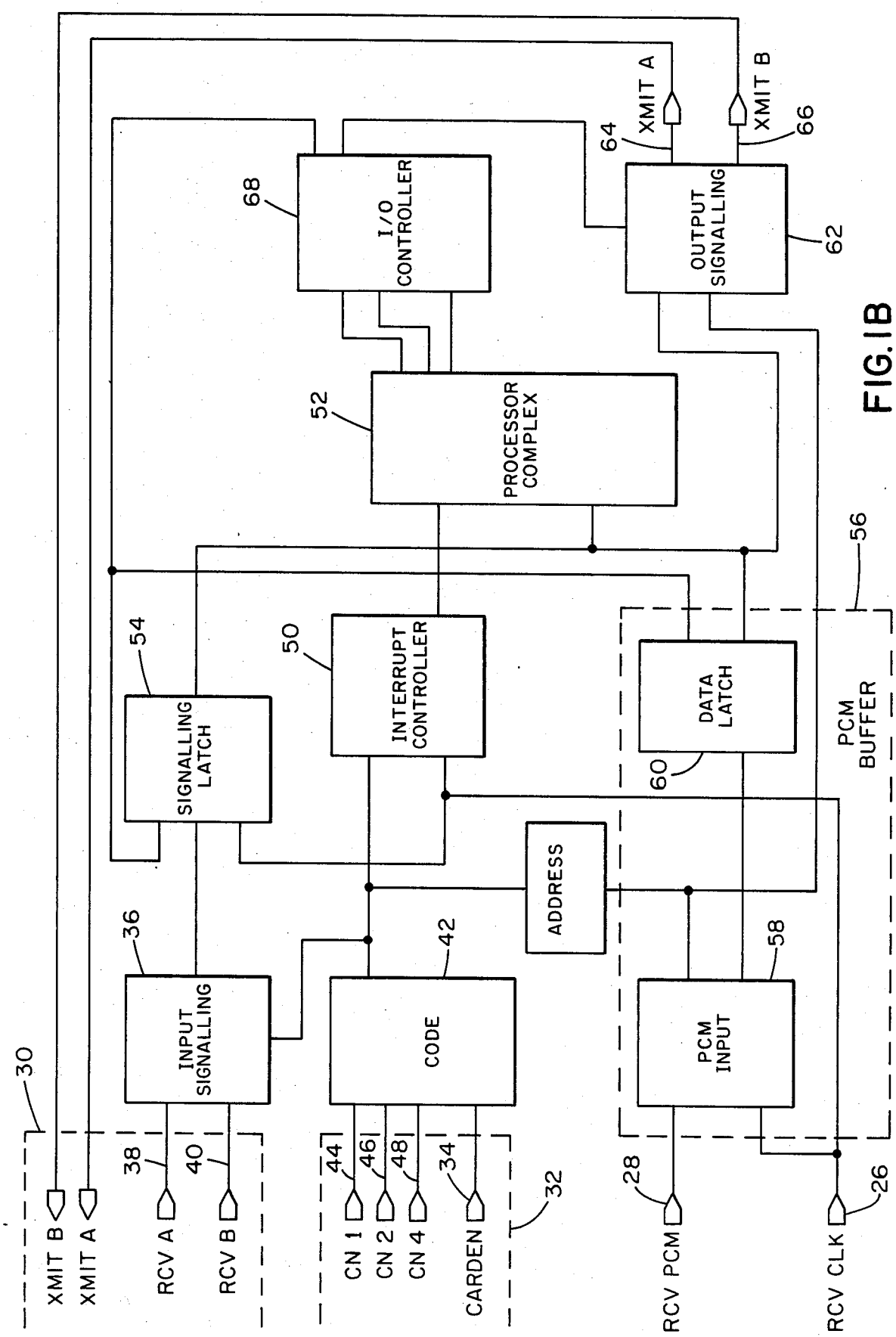
FIG. 1B is a more detailed block diagram of the answer detector.

FIG. 1B is a more detailed block diagram of the answer detector 10. In the preferred embodiment the answer detector 10 receives a PCM data stream on line 28 which has 4 channels in a time multiplexed form. The answer detector 10 utilizes the clock signal on line 26 for appropriate timing of all functions within the answer detector 10. After the automatic call distribution system dials the last number of a telephone call, it then selects the answer detector 10 and if the answer detector 10 is idle, connects it to the appropriate telephone line. An enable signal on the CARDEN line 34 turns on the answer detector and strobes the input signalling circuit 36. Four channels are received in the PCM data stream on line 28. The input signalling circuit 36 receives the first and second control signals on lines 38 and 40. The address decode circuit 42 receives address signals on lines CN1, CN2 and CN4 (44, 46 and 48). An interrupt controller 50 is connected to the address decode circuit 42 and is also initialized by the enable signal received by the address decode circuit 42. The interrupt controller 50 sends an interrupt signal to the processor 52 to initialize the processor 52.

The input processor 52 reads the input signalling received by the input signalling circuit 36 to the signal latch 54. The processor 52 also reads the PCM data stream from lines 26 from the PCM buffer 56. The PCM buffer 56 handles the four channels in the PCM data stream.

The PCM buffer 56 has a PCM input circuit 58 for converting the serial format of PCM data stream to a parallel format. The data latch 60 in the PCM buffer 56 provides a deep buffer for providing the necessary time delays needed by the processor 52. When the answer detector 10 responds to the automatic call distribution system 12, the processor 52 writes the appropriate response into a buffer which is then converted by the output signalling circuit 62 into the proper serial time multiplexed format on transmit lines 64 and 66. The I/O controller 68 is utilized by the processor 52 to read the I/O ports of the various other circuit blocks in the answer detector 10.

Figure 1C:
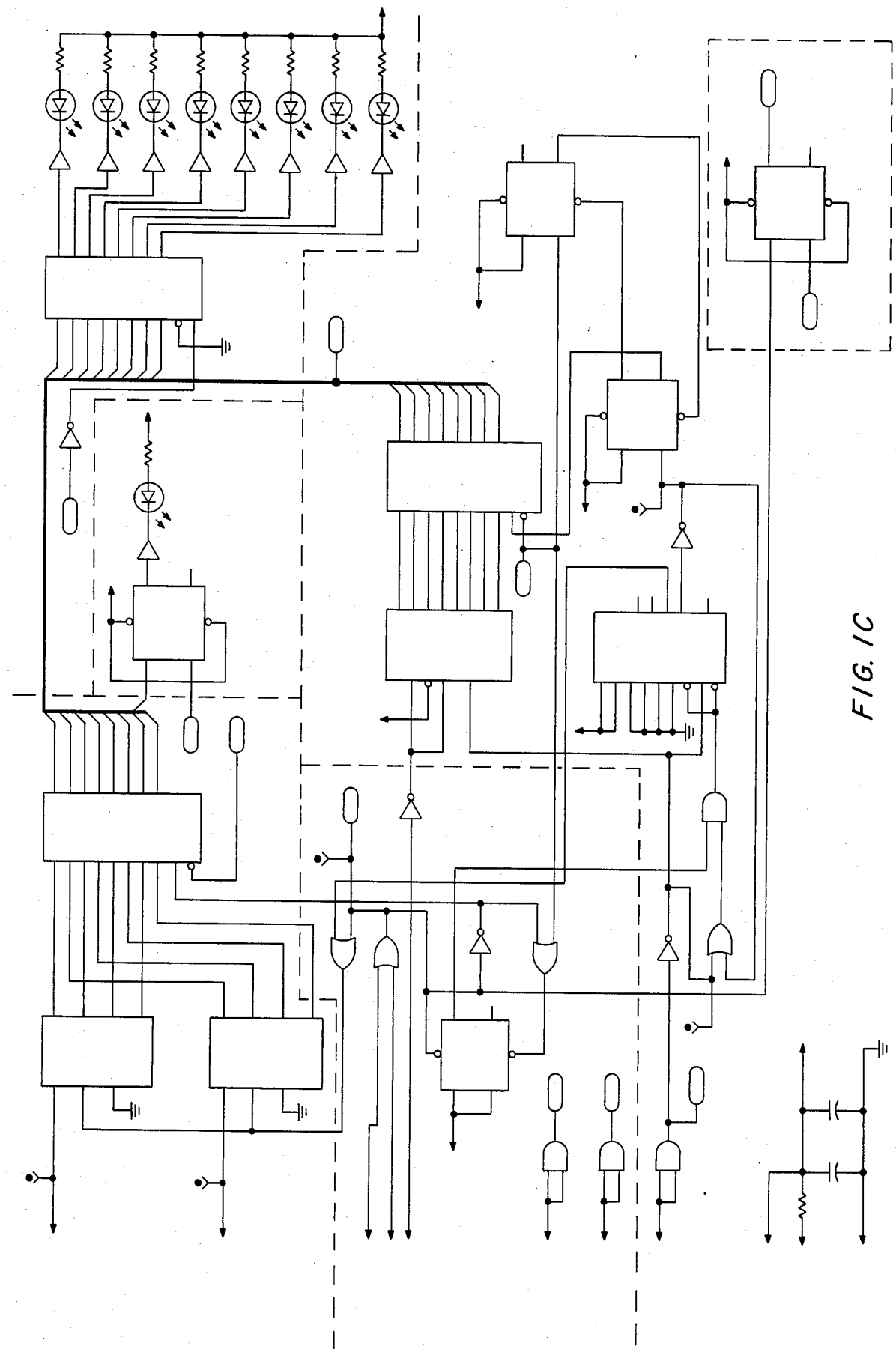
FIG. 1C and 1D are schematic diagrams of the circuitry of the answer detector.
Figure 1D:
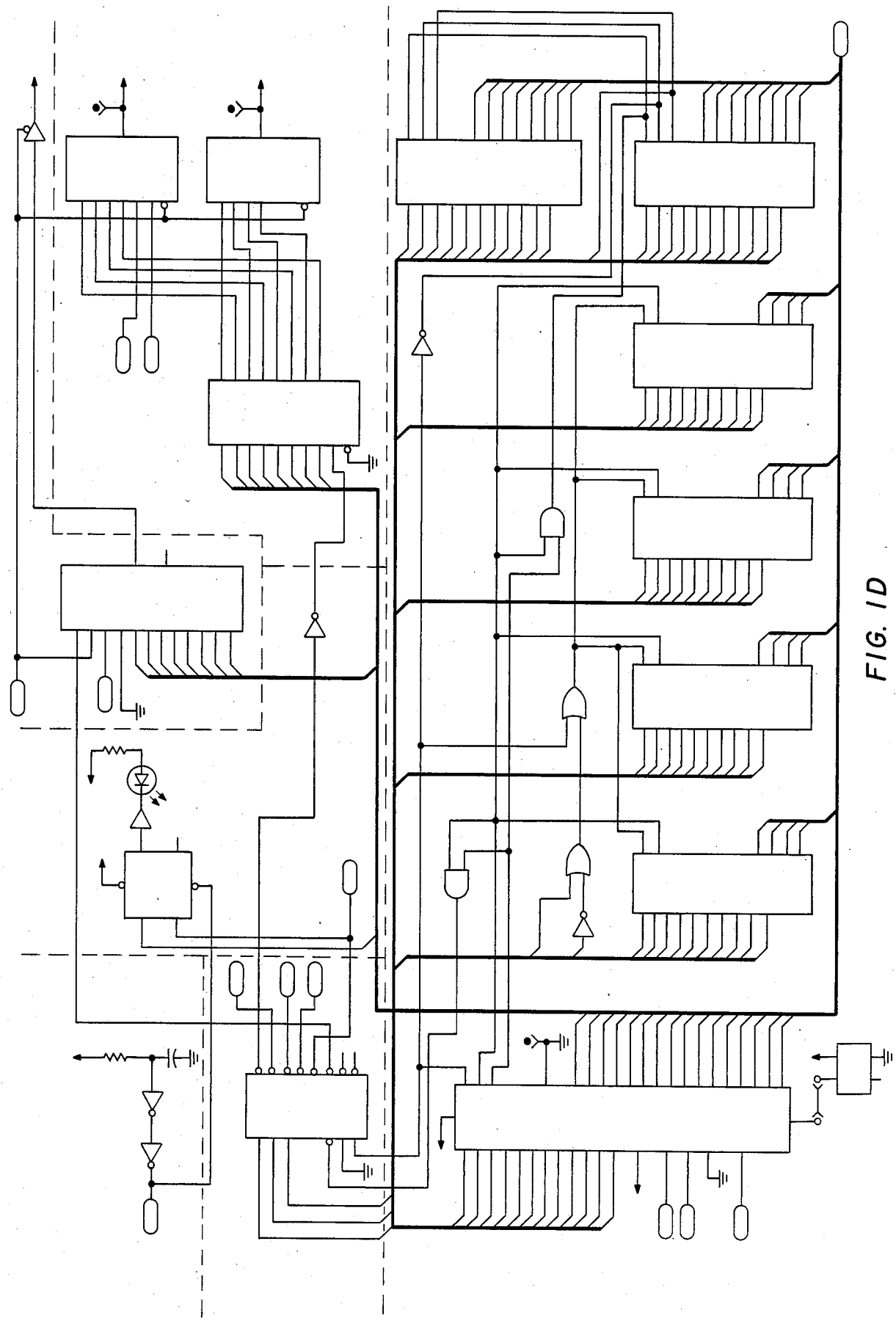
Figure 2:
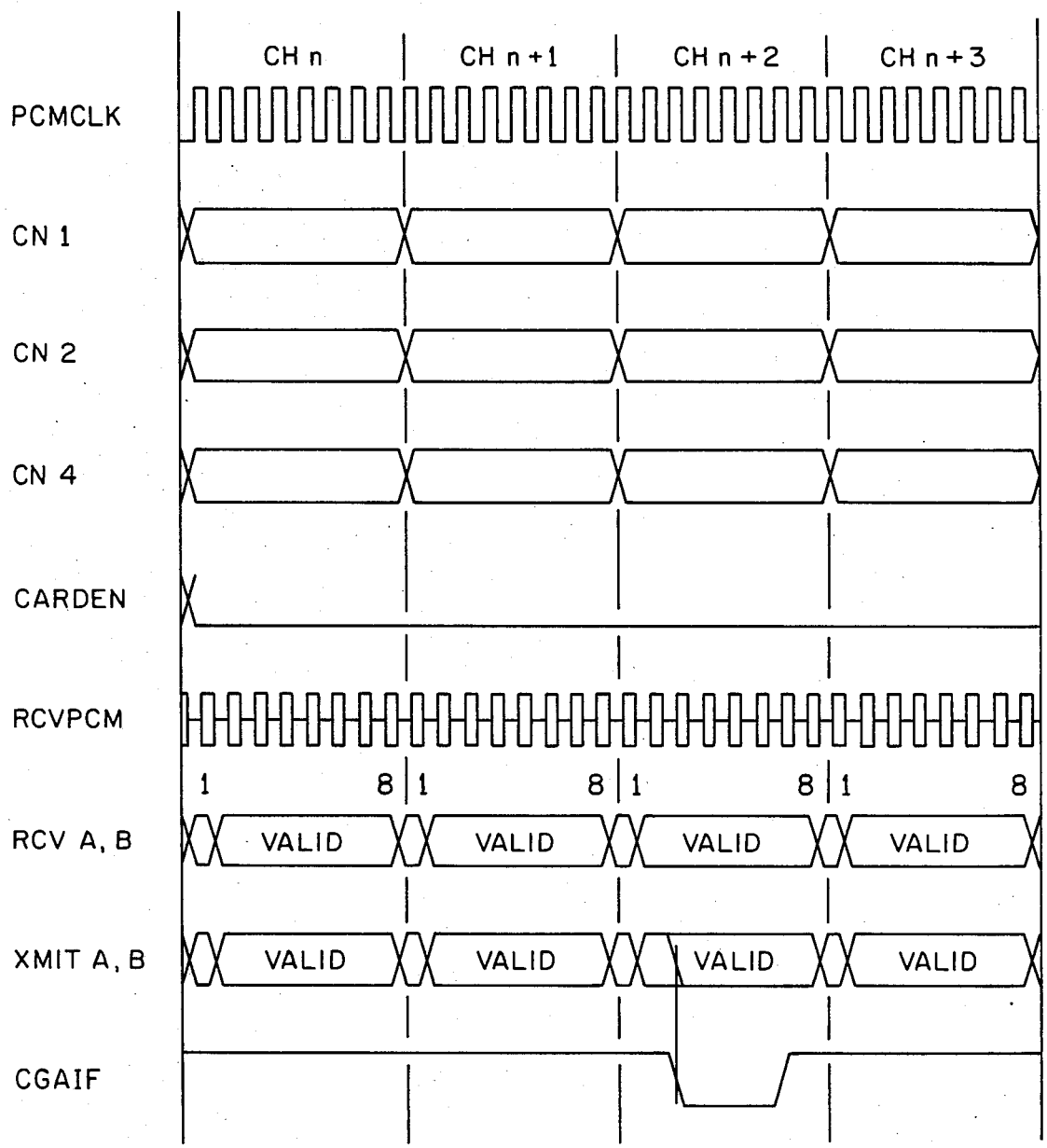
FIG. 2 is a timing diagram illustrating the various signals received by the answer detector.

FIGS. 1C and 1D are circuit diagrams depicting a preferred embodiment of the answer detector 10. Various blocks of circuitry in FIGS. 1C and 1D are identified to correspond to the detailed block diagram of the answer detector shown in FIG. 1B. FIG. 2 is a timing diagram which illustrates how the answer detector 10 receives call progress tones and voice in a serial PCM data stream from the automatic call distribution system. The answer detector 10 has four channels; however, any number of answer detectors 10 may be used with an automatic call distribution system. The call distribution system selects any one of the answer detector 10 which is idle for use at any particular time.

Figure 3C:
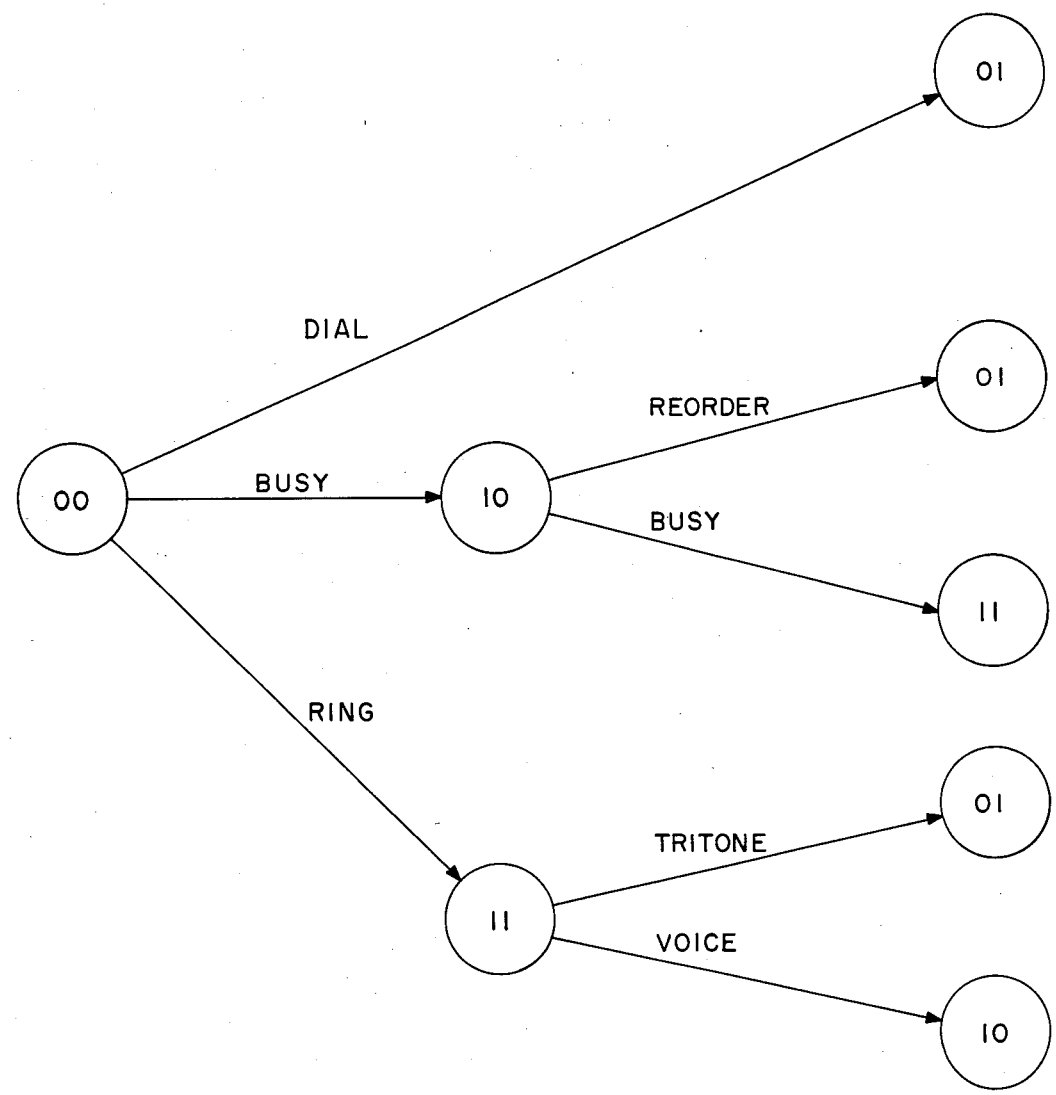
FIG. 3C is a state diagram of the response of the answer detector to first and second control signals received from the automatic call distribution system.

An idle answer detector (AD) tells the automatic call distribution system (ACD) that it's available by setting the Xmit A, Xmit B leads to 00. The ACD seizes an idle AD by setting the RCV A, RCV B leads to 01. When the ACD seizes the AD it establishes an audio path through the PCM stream. Once the AD is seized, the AD responds to any of seven conditions:

1. Ringback
2. Voice
3. Tritone
4. Busy tone
5. Reoder tone
6. Dial tone
7. No response from AD FIG. 3A is a table showing how the AD and ACD respond to events and FIG. 3B is a table of tone specifications utilized by the AD and ACD. FIG. 3C is a state diagram for the AD response to control signals from the ACD.

When the AD senses ringback tone it sets the Xmit A and Xmit B leads to 11. This state is maintained for 80 ms. Ringback is a transition state; either voice or tritone is expected afterward.

It is possible that the AD will be sent voice or tritone without being sent ringback tone first. Because the signalling bits have multiple meanings, the ACD must see the ringback transition before it can interpret the final signalling state as voice or tritone. Therefore, if the AD detects voice or tritone, but ringback was not sent first, the ringback state is inserted for 80 ms. After 80 ms. the voice or tritone event is reported to the ACD.

Figure 4:
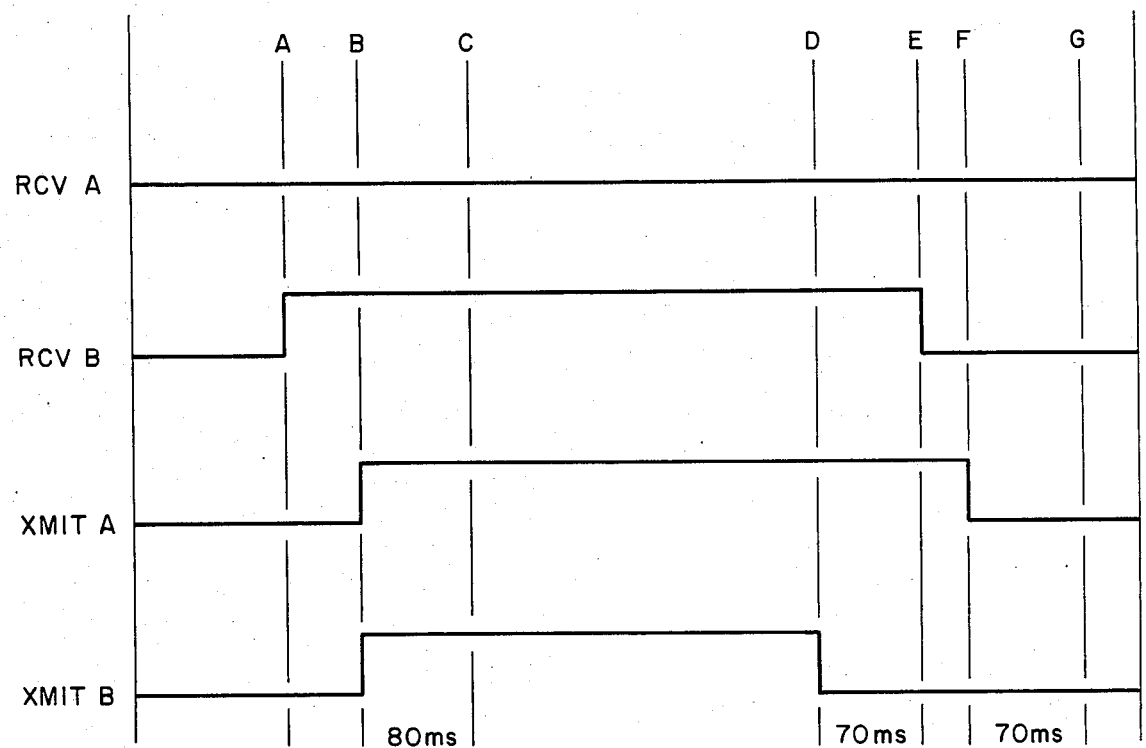
FIGS. 4 through 10 are graphs depicting the input and output signals to the answer detector under different telephone call conditions regarding tone and voice energy.
Figure 5:
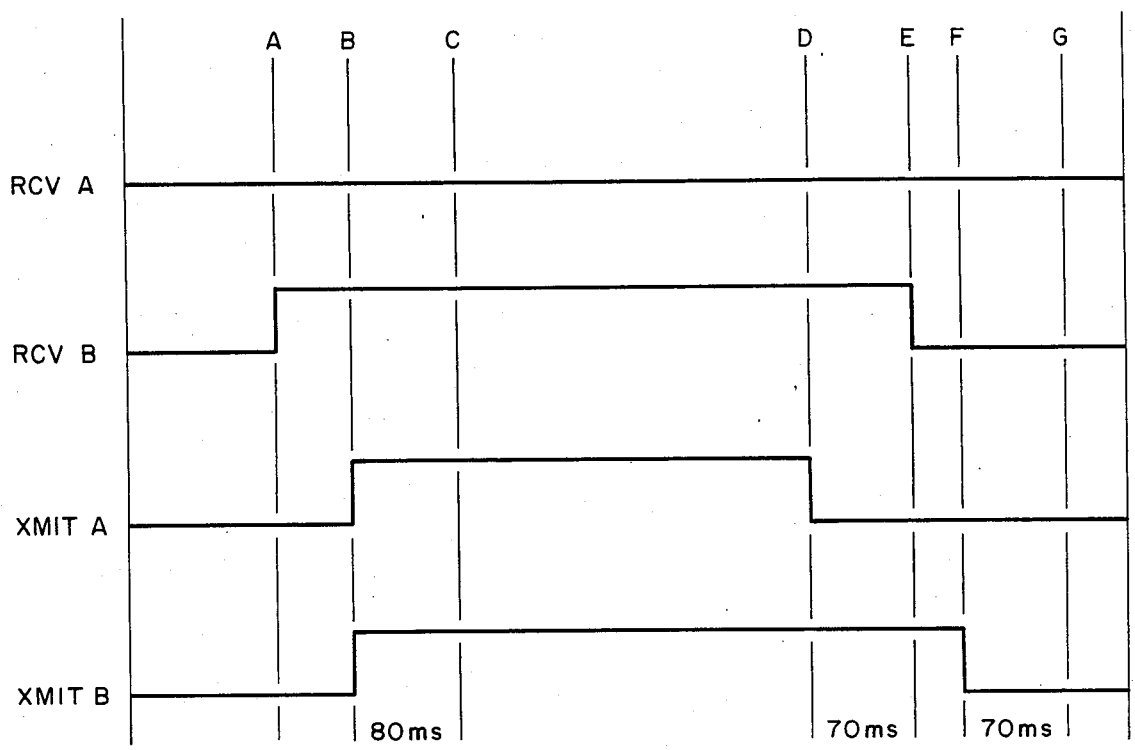

When the AD senses voice it sets the Xmit A, Xmit B leads to 10 (see FIG. 4). If the ringback state has not been detected previously, it is inserted, and reporting of the voice event is delayed in 80 ms. (while ringback is being reported).

Busy and reorder tones are the same frequency so cadence is used to differentiate between them. When the AD senses the frequency (480 Hz+620 Hz) it does not yet know if the tone is busy or reorder. While the AD analyzes the tone it sends the ACD a transition signal. This transition says that either busy tone or reorder tone has been detected, and lasts for 80 ms. minimum. After 80 ms. a new report can be sent to the ACD identifying the tone as busy or reorder.

Figure 6:
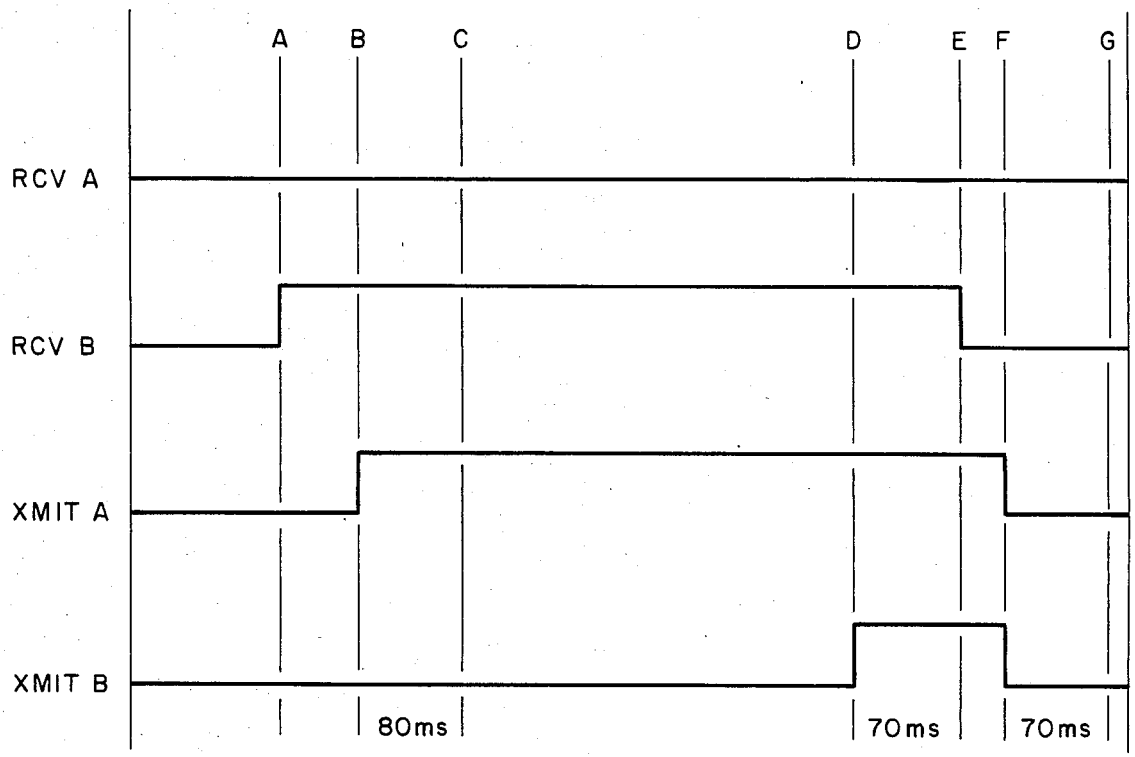

When the AD senses busy tone it sets the Xmit A, Xmit B leads to 11 (see FIG. 6). The ACD releases the outgoing trunk and then releases the AD by setting the RCV A, RCV B leads to 00.

Figure 7:
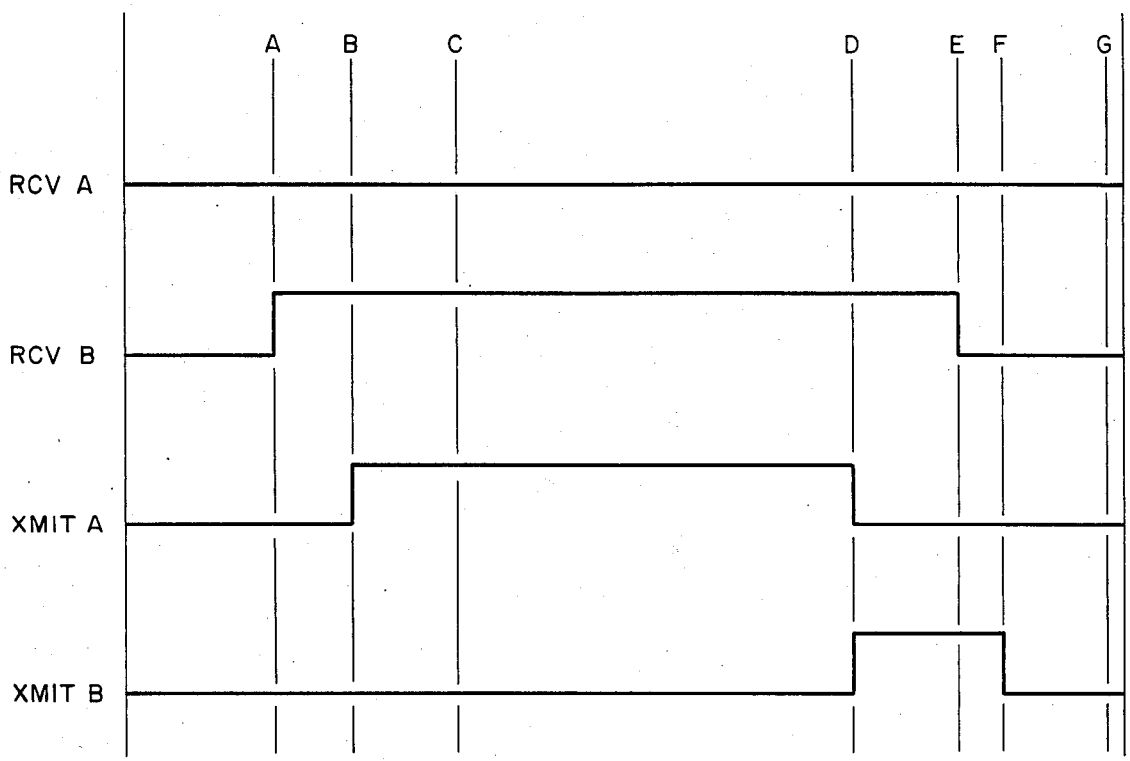

When the AD senses reorder tone it sets the Xmit A, Xmit B leads to 01 (see FIG. 7). The ACD releases the outgoing trunk and then releases the AD by setting the RCV A, RCV B leads to 00.

Figure 8:
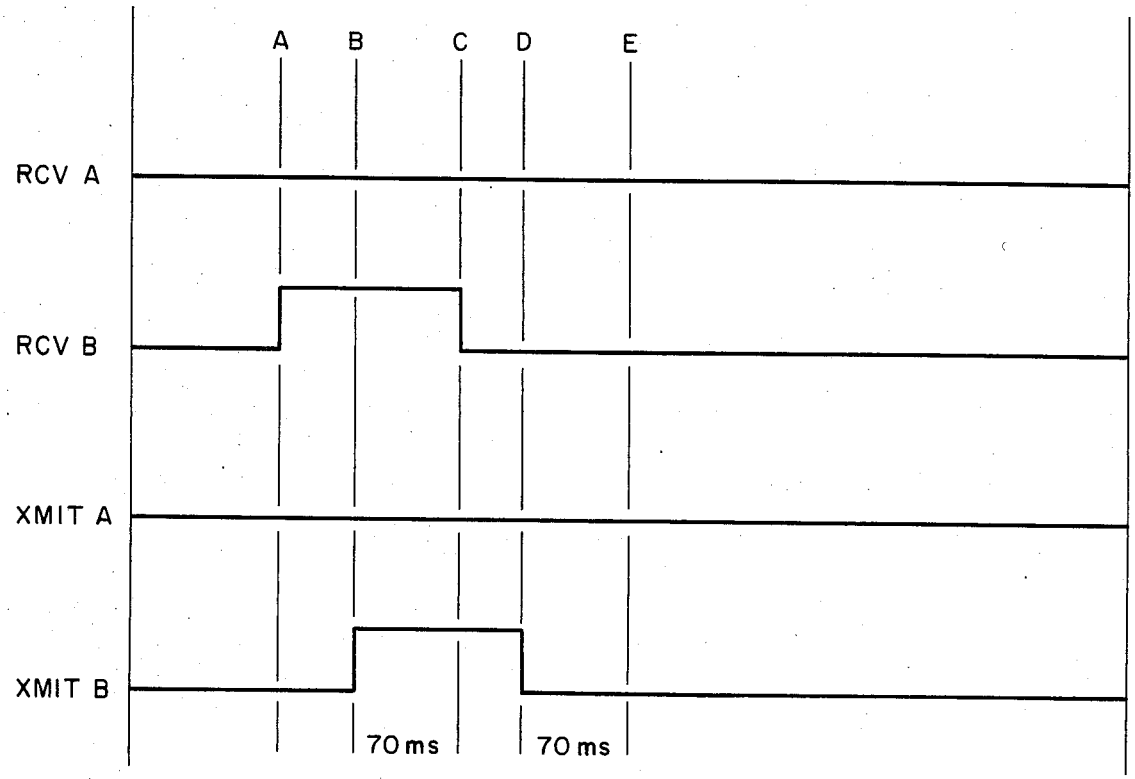

When the AD senses dial tone it sets the Xmit A, Xmit B leads to 01 (see FIG. 8). The ACD releases the AD by setting the RCV A, RCV B leads to 00.

When the AD senses dial tone it sets the Xmit A, Xmit B leads to 01 (see FIG. 8). The ACD releases the AD by setting the RCV A, RCV B leads to 00.

Figure 9:
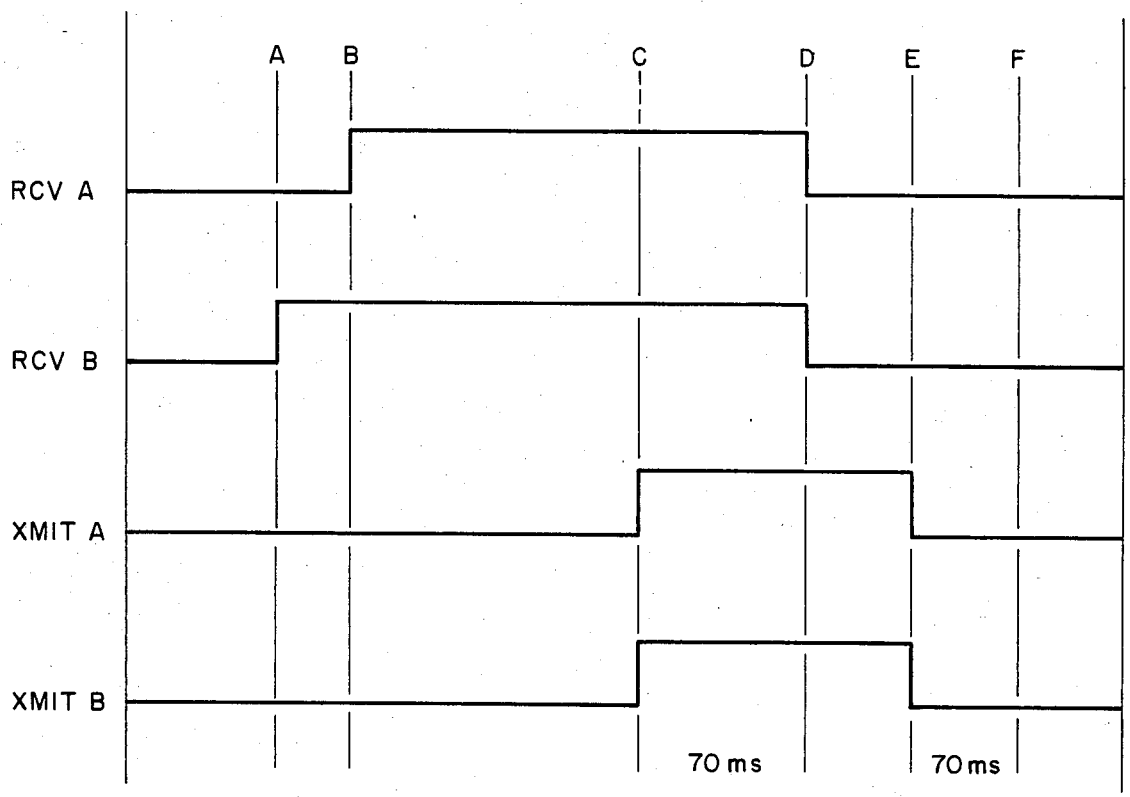

If the AD doesn't respond to a seizure request, the ACD times out, terminating both the request and the call (see FIG. 9). Then the ACD tells the AD to test itself. If the AD sets the Xmit A, Xmit B leads to 11 in reponse to the test request, the ACD assures that the AD is working. If the AD doesn't respond the ACD sets an alarm and puts the AD out of service.

Figure 10:
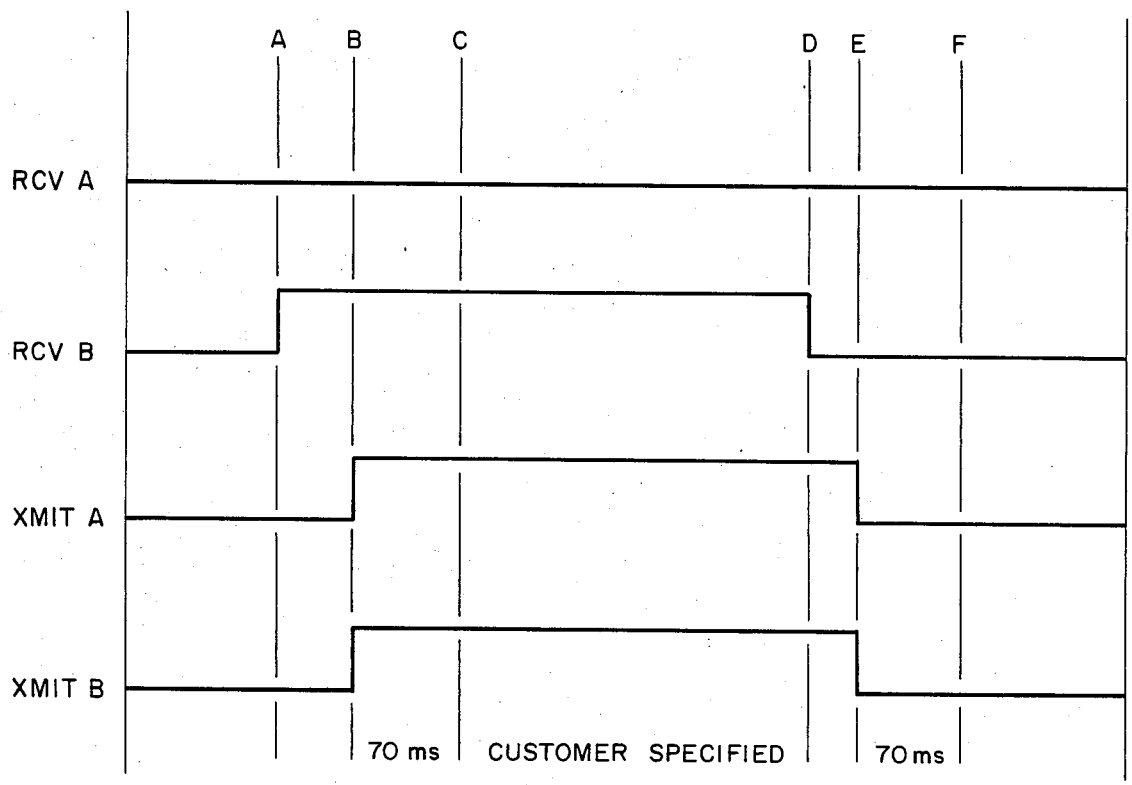
Figure 11:
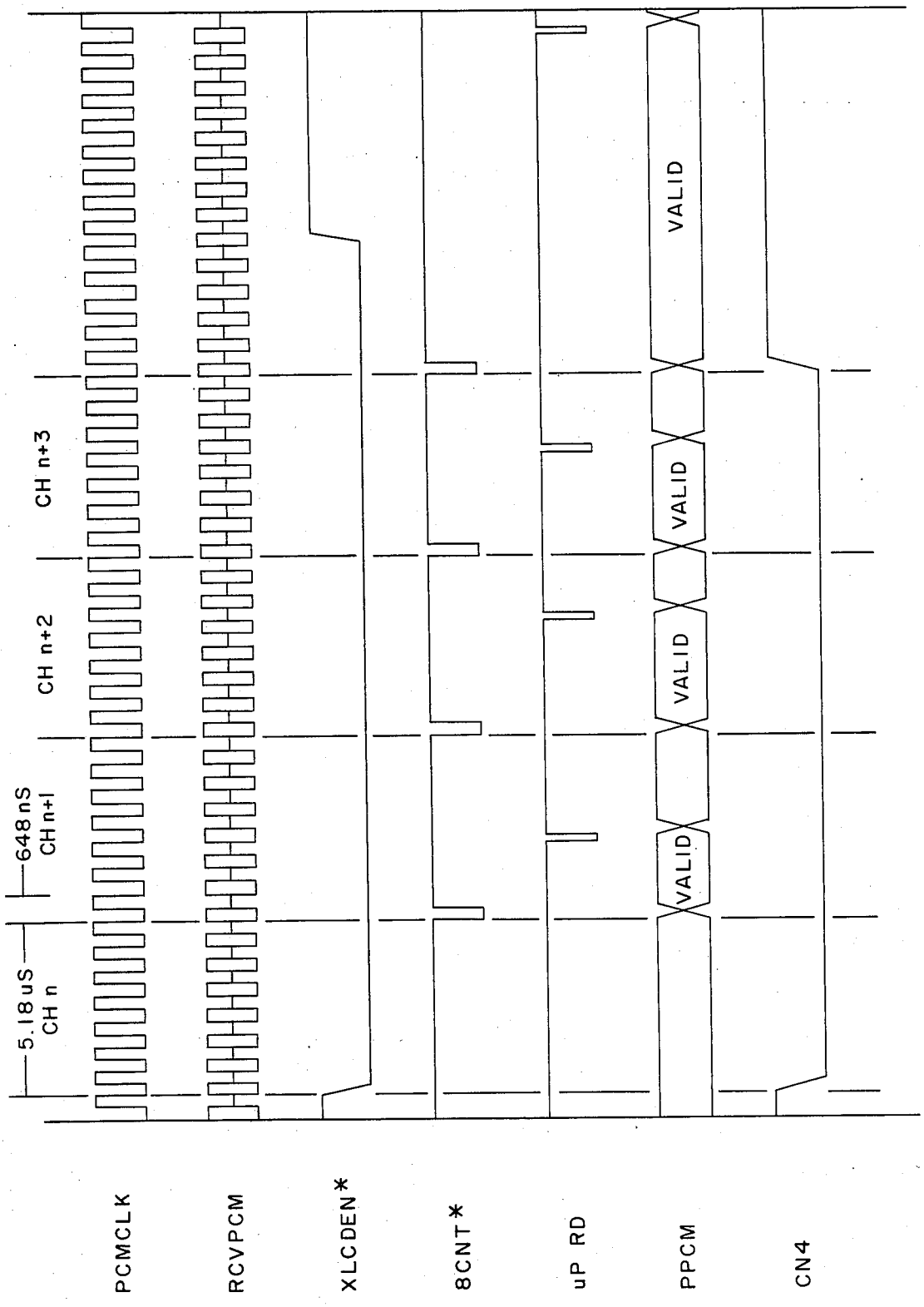
FIG. 11 is a diagram depicting the wave forms in the PCM buffer in the answer detector.
Figure 12:
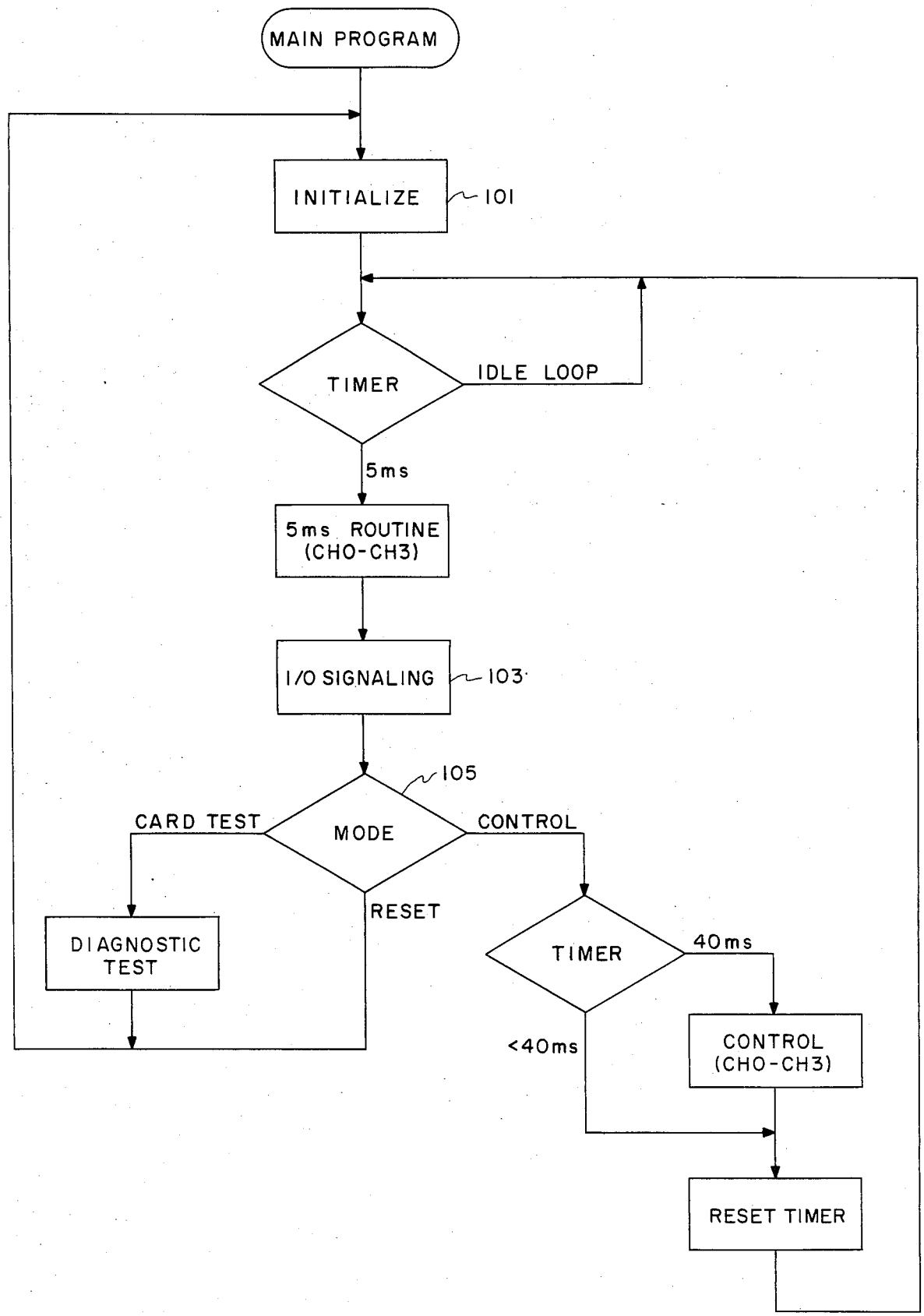
FIGS. 12 through 19 are flow charts depicting the program stored in firm ware in the processor in the answer detector.

The AD times out if ringback is detected for a period of time that is specified by the customer (see FIG. 10). The ACD releases the outgoing trunk and then releases the AD by setting the RCV A, RCV B leads to 00.

Figure 17A:
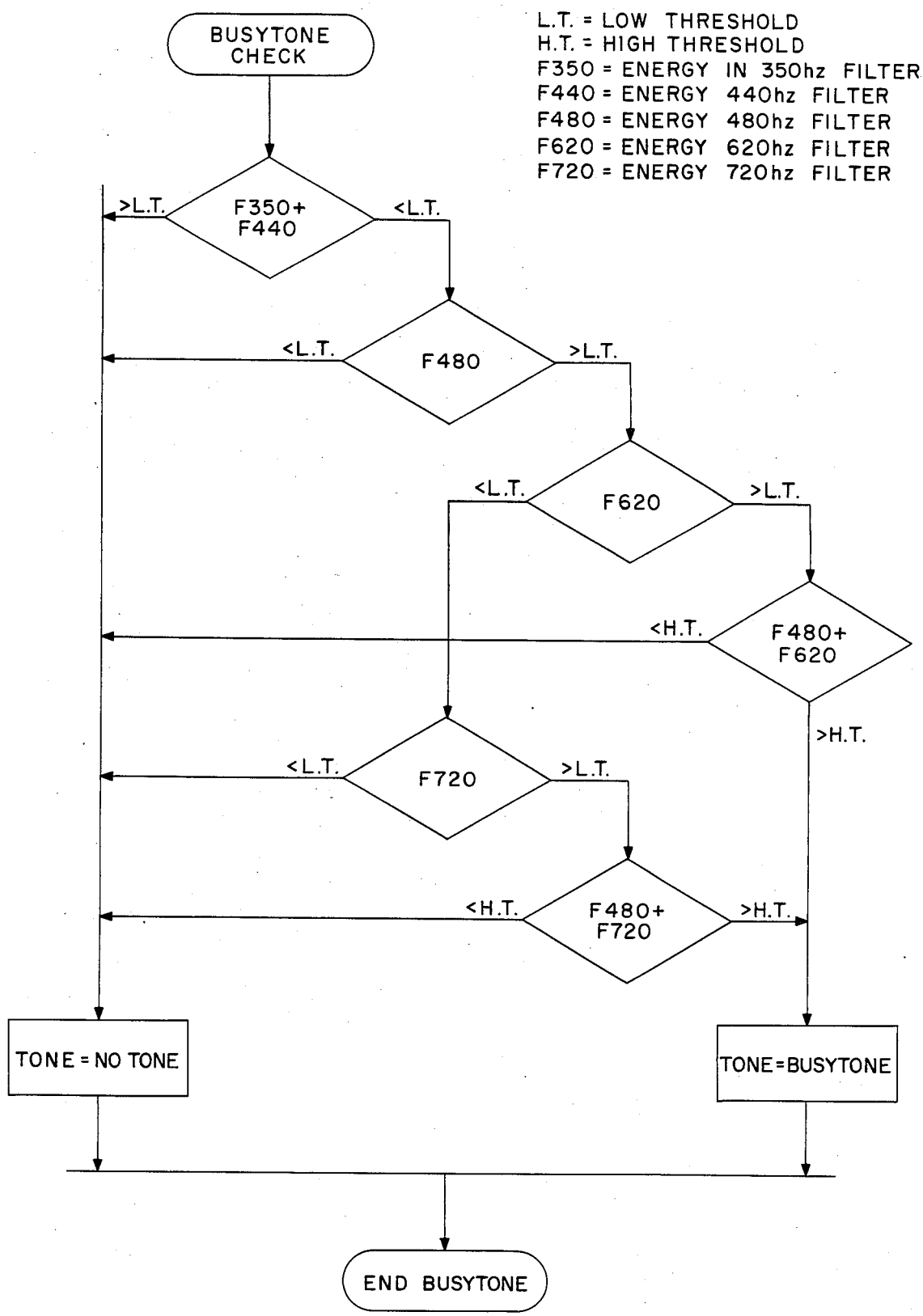
Figure 17B:
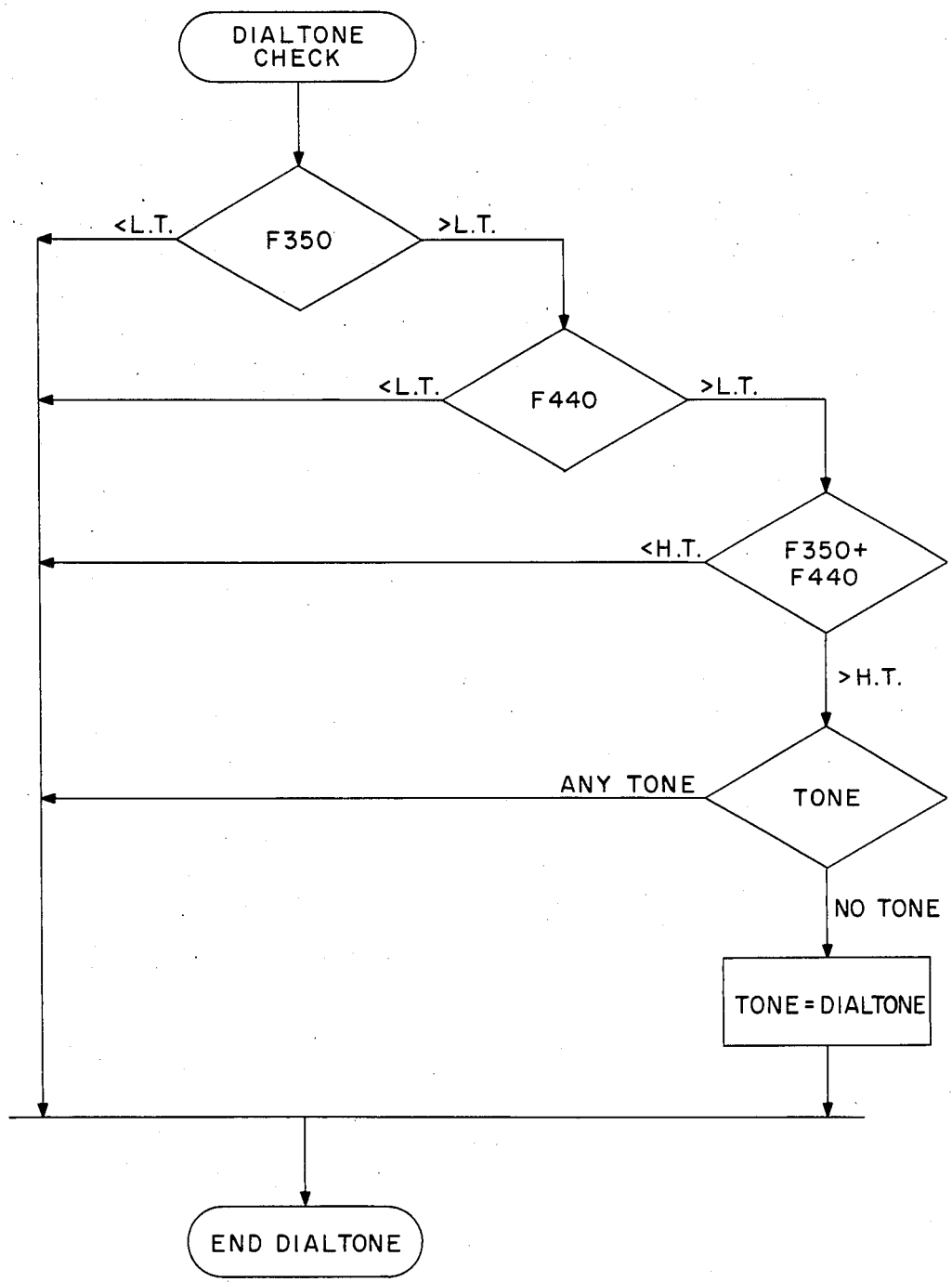
Figure 17C:
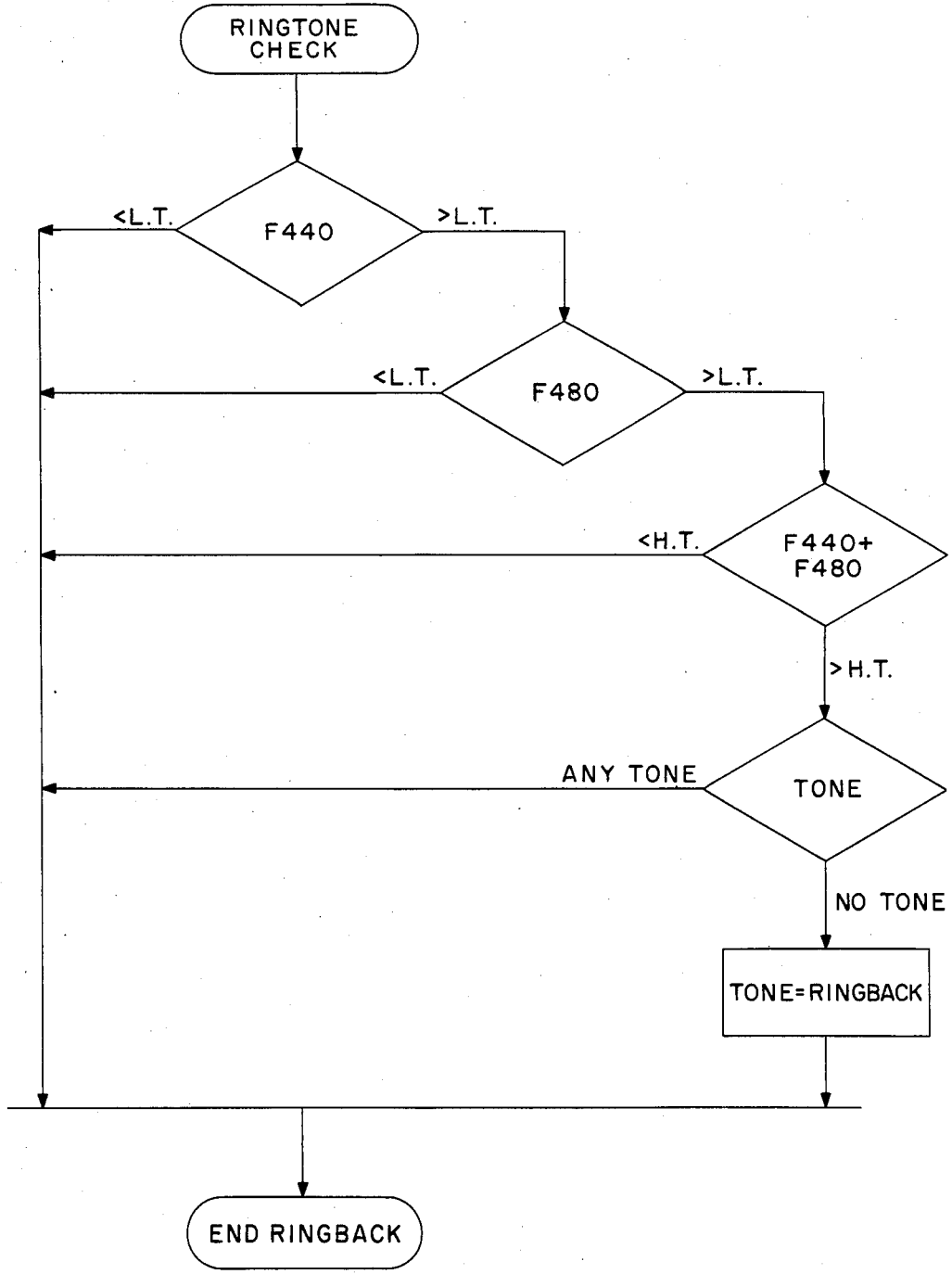
Figure 18:
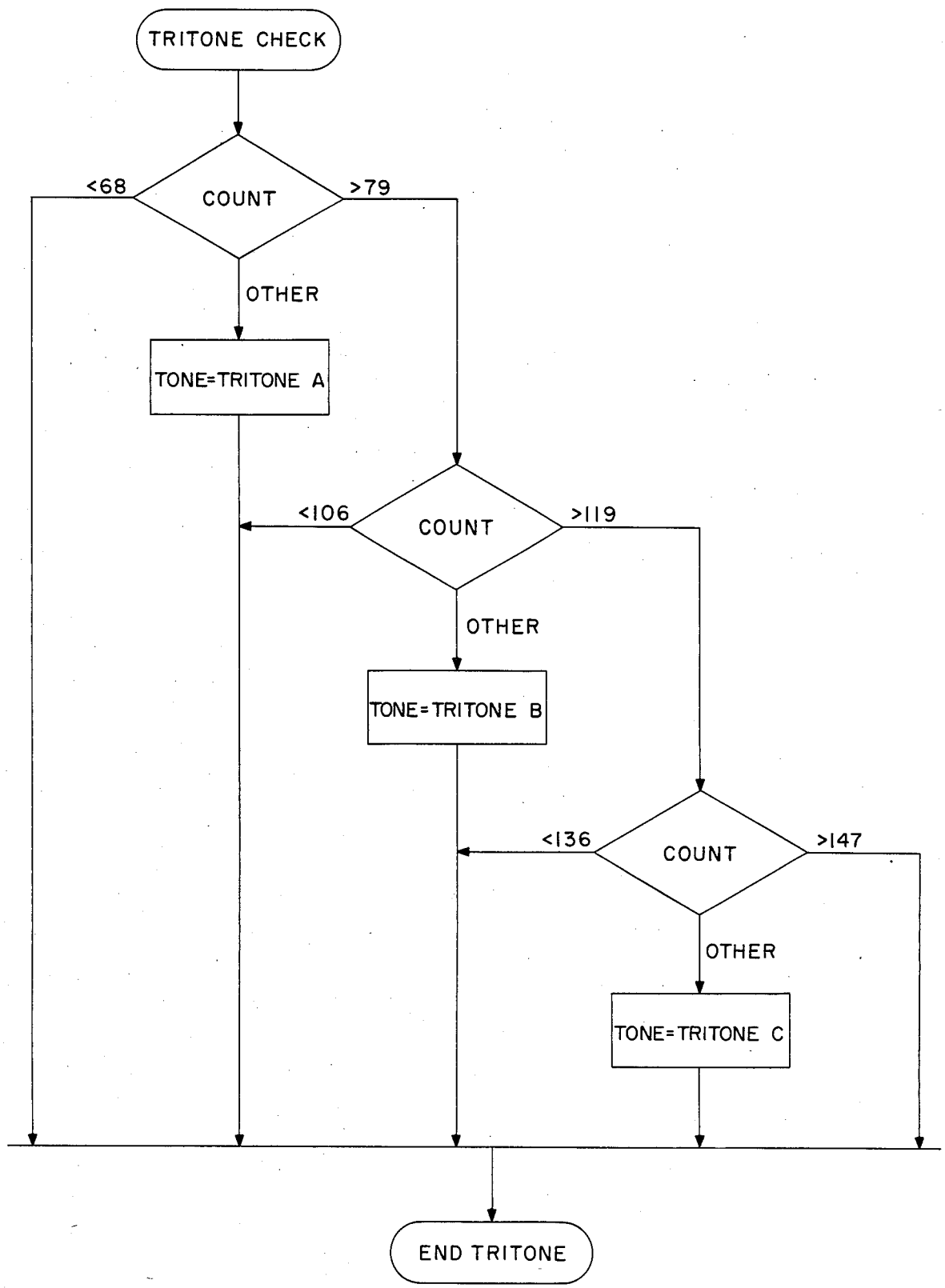
Figure 19:
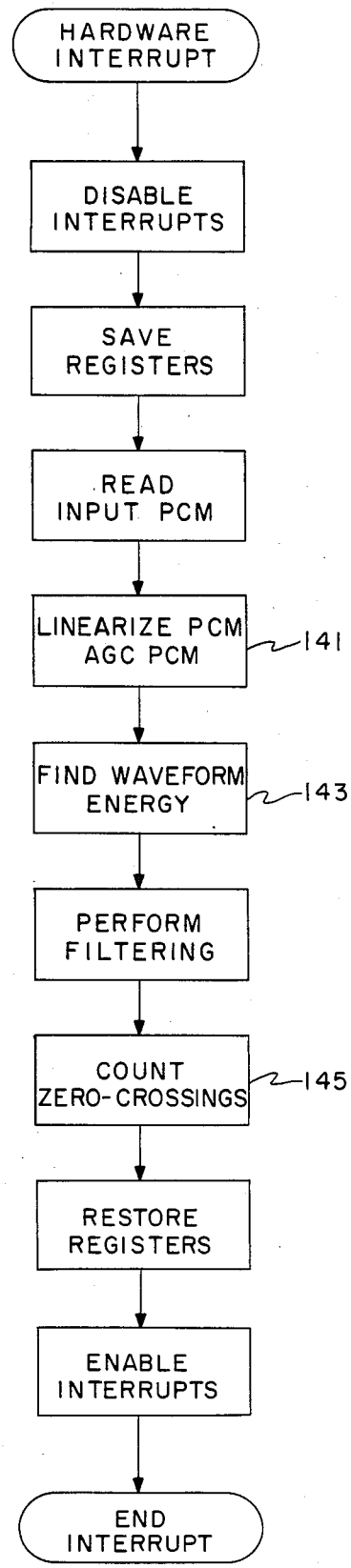

The flow charts for the answer detector function and operation are illustrated by FIGS. 12 to 19. The operation is broken into two sections: The main program (FIG. 12); and the hardware interrupt routine (FIG. 19). The program will provide answer detection for four PCM channels. The main program is controlled by the channel A (Ch A) and Channel B (Ch B) input signalling associated with the PCM channel being detected. The main program uses data obtained during the hardware interrupt routine that provides real time processing, every 125 $\mu$s, on each PCM sample received.

The hardware interrupt routine provides a real time clock for each channel, a filter function, and a counter function. The data derived from these functions are used by the main program to make a decision as to the type of tone being received.

The overall main program is illustrated by the flow diagram 12. When power is turned on, the power-on-clear function 101 will initialize the software and hardware registers and download data from ROM to RAM. A software interrupt occurs every 5 ms (FIG. 13) allowing the execution of the rest of the main program.

The input signalling 103 is sampled every 5 ms for changes. When a change is detected and verified (by comparing two adjacent samples) the appropriate action is pursued.

The MODE 105 is defined by comparing the input signalling of all 4 channels. If all of the channels are reset, then the reset mode is specified and the card will be re-initialized.

If all the channels are in test mode then a diagnostic test is performed on the hardware. If the hardware passes the diagnostic test, the output signalling on each channel will be set to Ch A=1 and Ch B=1. If diagnostic test fails, the output signalling will be sent to Ch A=1 and Ch B=0.

Any other combination of input signalling will result in the control mode of operation.

Figure 14:
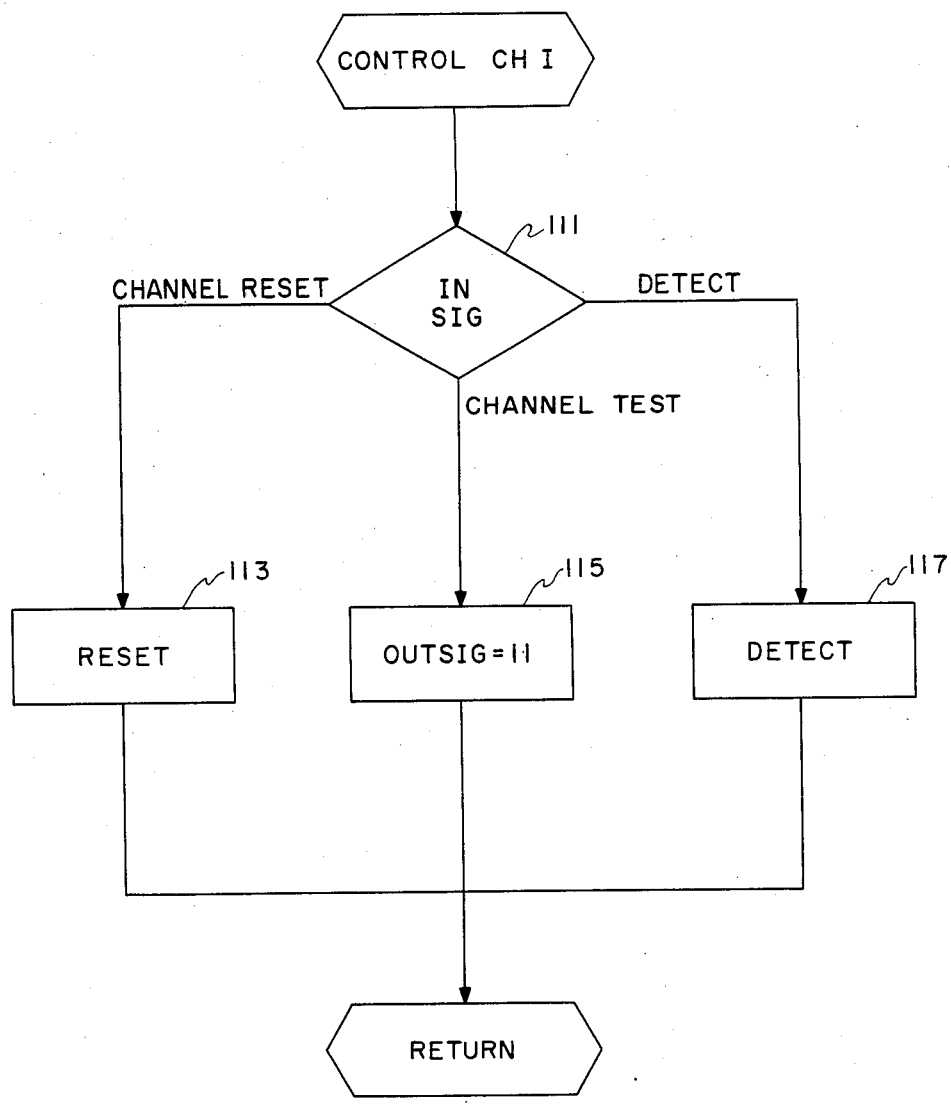

The control routine for one of the 4 channels is illustrated by FIG. 14. The control routine checks the input Ch A and Ch B signalling 111 to determine the operation to be performed. If both signalling channels are 0, then the software and hardware uniquely associated with that channel will be reset 113 and initialized. Both input channels being logic 1 will cause the CHANNEL TEST operation 115 to be performed. If Ch A=0 and Ch B=1, then the DETECT mode 117 of operation will be executed.

Figure 13:
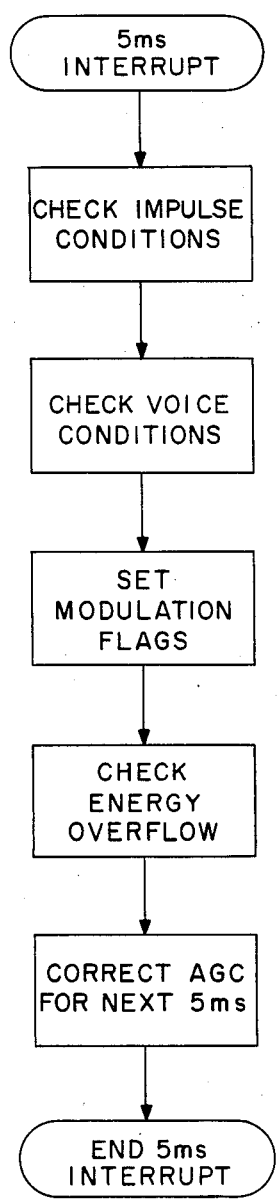

The data created during the interrupt routine is evaluated every 5 ms. as illustrated by the flow diagram shown in FIG. 13. The 5 ms. zero-crossing count and AGC are compared to values corresponding to impulse conditions. If conditions are present, the impulse flag is set.

The filter outputs and AGC parameters are evaluated for conditions that indicate that voice is present. If voice condition are present, then the "maybe" flag is set.

The waveform modulation flag is set if the waveform energy voids more than 20% from the quiescent value.

The overflow flag is set if the waveform energy calculation overflows.

The final operation performed in the 5 ms. routine is to correct the AGC, based on energy measured for the next 5 ms. interval.

Figure 15:
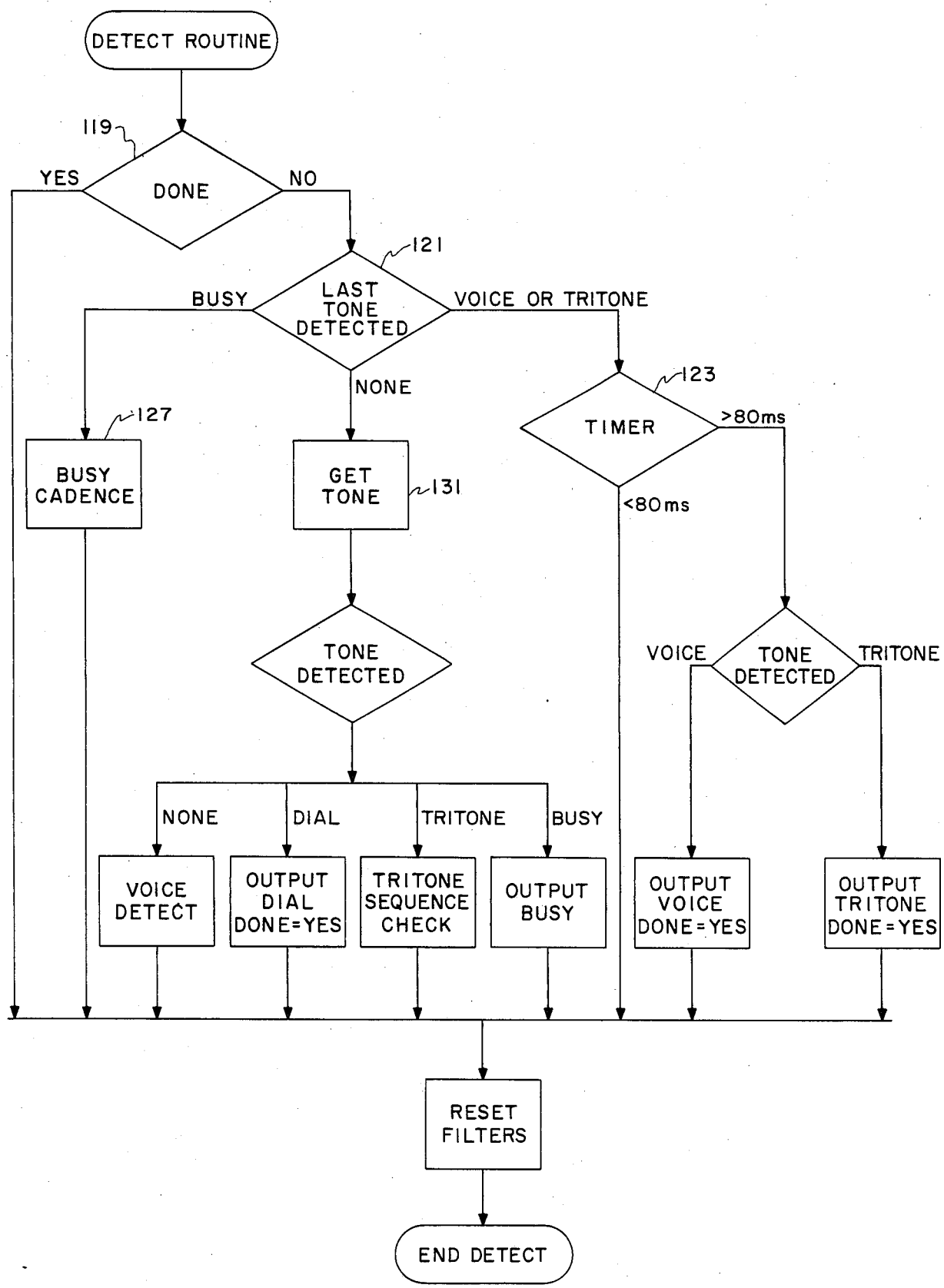

The main function of the program is performed by the detect routine (see FIG. 15). The routine looks at variables set during the 5 ms. interrupt routine, by earlier passes through the routine; as well as data obtained by the hardware interrupt routine.

The routine first looks at the DONE flag 119; if the DONE flag is set, then the DETECT routine is skipped.

The next flag checked is the TONE flag 121. If VOICE or TRITONE signals have been detected, then a timing function 123 is performed to guarantee the intermediate RINGBACK output signalling state has been active for the minimum specified time of 80 ms. When the timeout is completed, the final output signalling state is transmitted and the DONE flag is set.

Figure 15A:
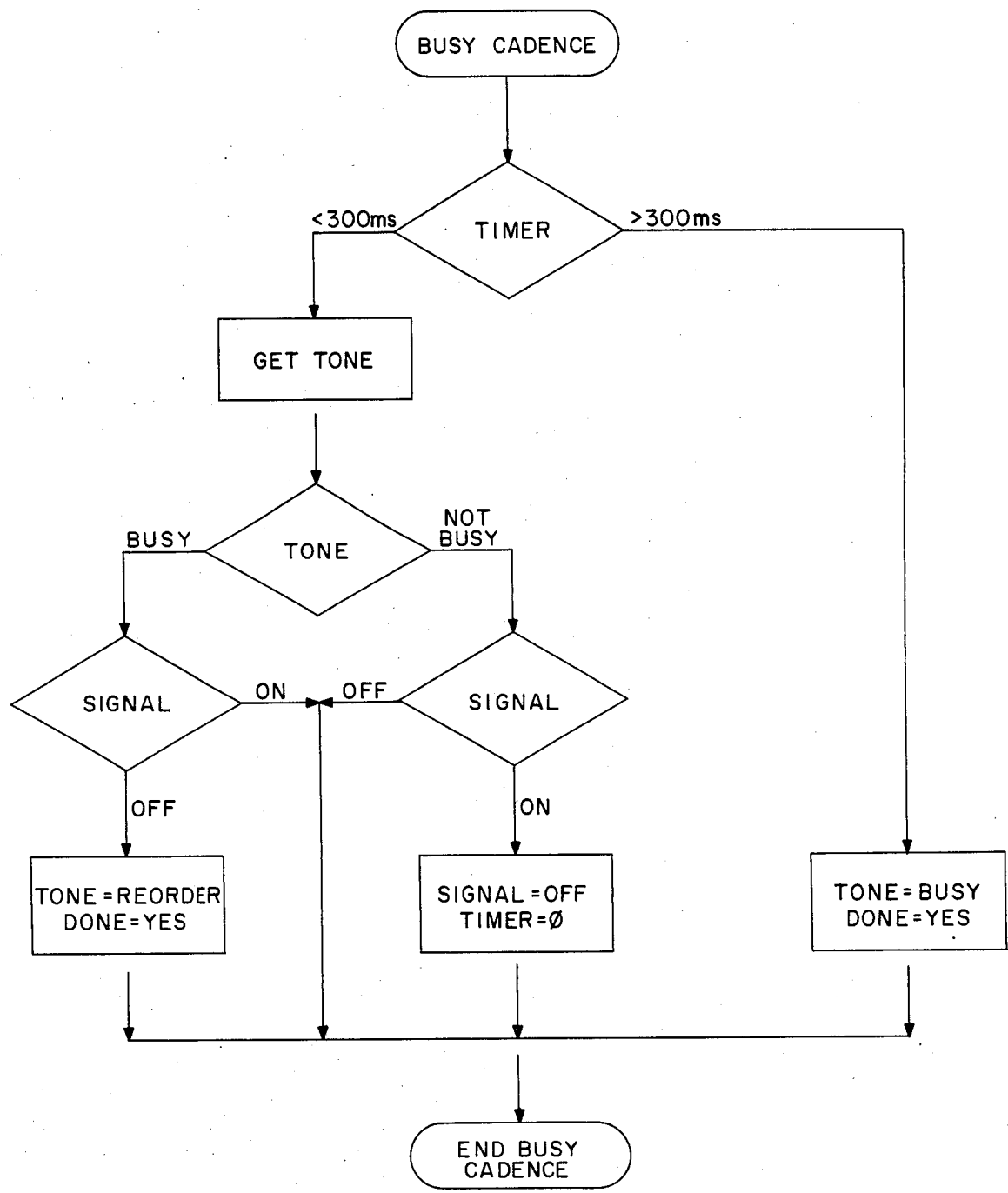

If the TONE detected previously was the BUSY tone (FIG. 17A), then the tone cadence is checked (see FIG. 15a) (127) to determine if the tone is actually a BUSY tone or a REORDER tone. Cadence is checked by measuring the on-time or off-time of the signal. The BUSY tone time variable is reset when BUSY tone is detected or at the on-to-off BUSY tone transition. TIME is allowed to increment when the signal is on or off. If the times exceeds 300 ms. then the tone is declared BUSY tone; otherwise, the tone is REORDER tone.

If the tone type has not been established during previous 40 ms. intervals, then the tone routine is executed. If BUSY tone is detected the BUSY tone output signalling is generated and the tone type is established to be BUSY tone. If Dialtone is detected (FIG. 17B), then the dialtone output signalling is transmitted and the done flag is set.

If the third tone in the tritone sequence is detected, then the Tritone sequence checks that the previously established tone was the 2nd tritone (FIG. 18).

Figure 15B:
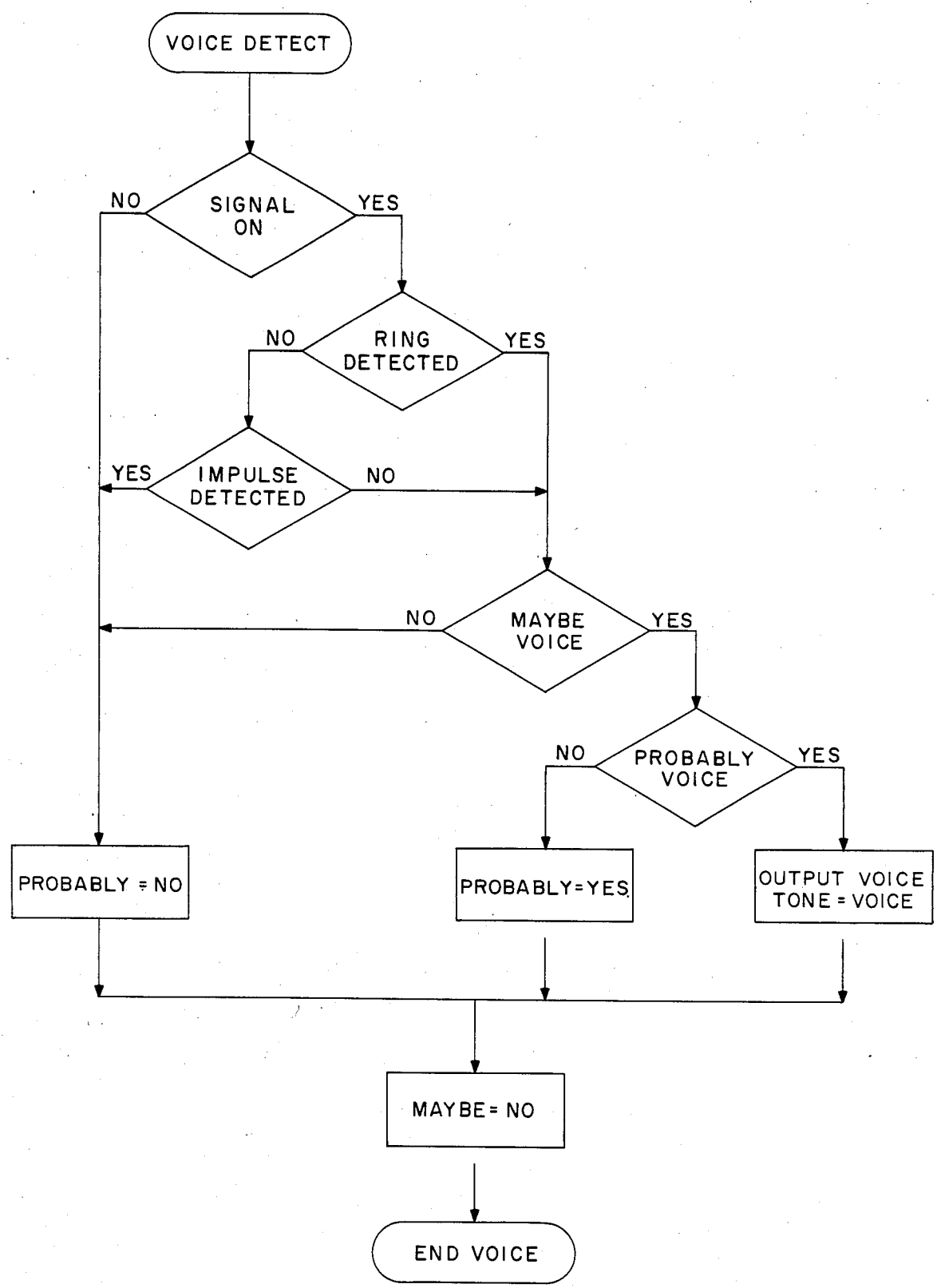
Figure 16:
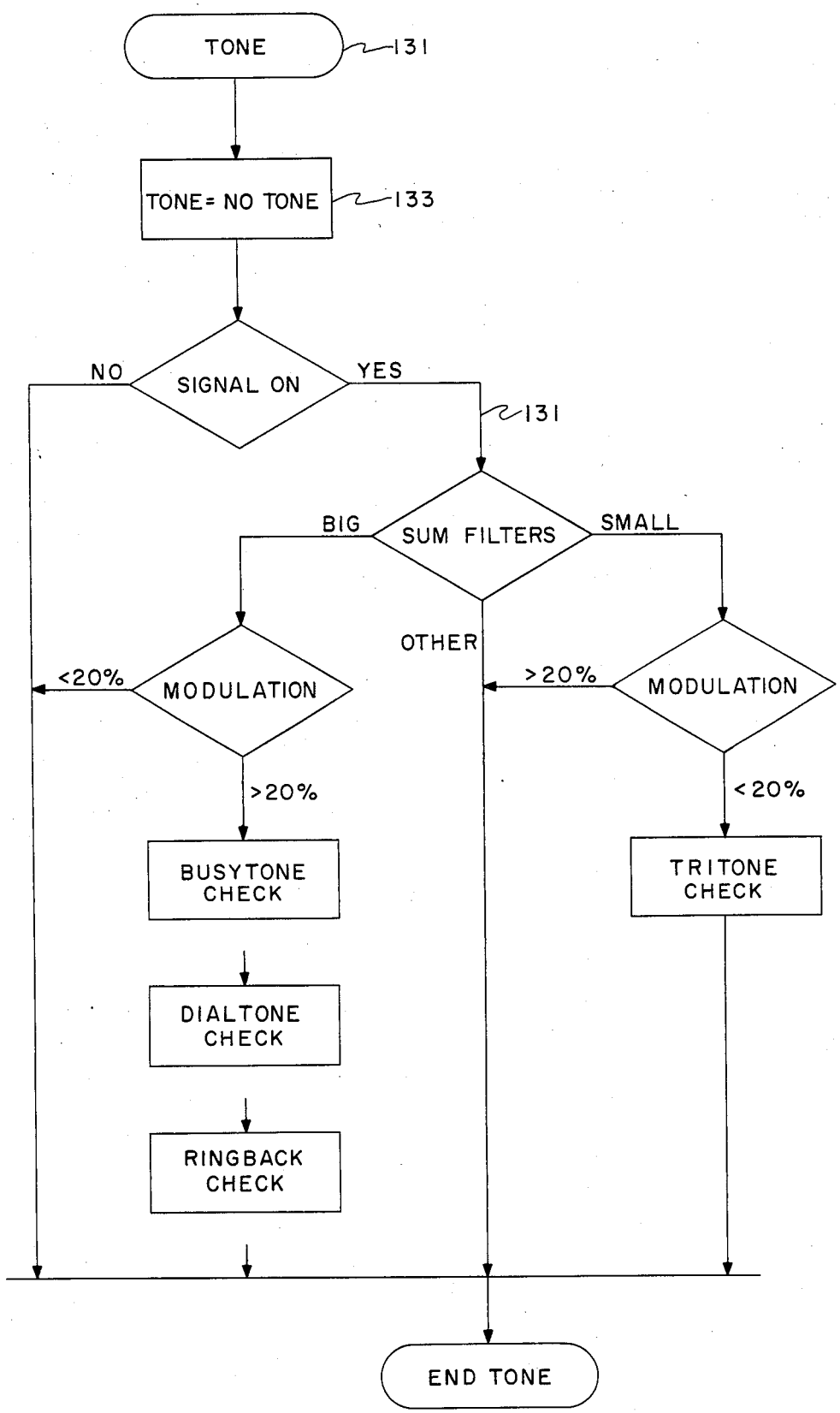

If no tone was detected, then the voice detection flow diagram (FIG. 15b) is executed. If the energy in the 40 ms. interval indicates a signal is present, then the voice detection proceeds. If RINGBACK has not occurred and an impulse occurs, (due to a switching transient), then the voice detection is aborted. Otherwise the "maybe" flag is monitored for voice conditions occurring during the 40 ms. interval. If the "maybe" flag is set and the "probably" flag is set from the previous 40 ms. interval, then the tone is established to be voice. If the "probably" flag is not set, it is set for the next 40 ms. interval.

The other tone types are detected by the TONE SELECT routine (see FIG. 16) 131 when the signal is present. When TIME=40, the TONE SELECT variables are reset (133). When TIME=40 ms., the filter and counteroutputs are evaluated to determine the tone type being received.

If the signal is not present, or if the overflow flag is set, then the tone select routine is aborted.

Filters are used for detecting BUSY tone, Dialtone and Ringback tone. A Zero-crossing counter is used to detect the 3 tritone frequencies. If the sum of the filter energies is great, then Busytone, Dialtone and Ringback tone detection flow diagrams are executed (FIGS. 17A, 17B, 17C). The algorithm expects the sum of energy from the expected tones to exceed $0.7 \times$ total sum out of the filters. The energy from each expected tone is to be greater than $0.1 \times$ the total filter energies.

If the total filter energy is very small, then the zero crossing counter is checked to see if the 40 ms. counts are within the expected limits for the 3 possible tritones. The modulation flag is not expected to be set if a tritone is present.

The hardware interrupt routine performs calculations on each PCM sample for each of the 4 channels every 125 μs (see FIG. 19). The flow diagram is representative of the one PCM channel operation. The hardware interrupt performs the initial AGC constant calculation (141), waveform energy calculation (143), filtering and incoming PCM frequency counting operation (145) used by the DETECT routine.

The first function performed is to disable any further interrupts and to save all registers used by both the hardware interrupt routine and main program. The PCM sample is linearized high pass filtered and factored by the AGC constant. The sample is squared and integrated to determine the energy in the waveform.

The routine performs the filtering to detect the quantitative energy in the 350 hz, 440 hz, 480 hz, 620 hz and 720 hz bands. A counter is used to detect positive zero crossings of the tritone signals to establish criteria for the tritone detection. Finally, the registers are restored to their original value and the interrupts are re-enabled prior to existing hardware interrupt routine.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. An answer detector for use with an automatic call distribution system having a bus with at least first and second control signals, address signals, PCM data stream and clock signal comprising:
    input signal means for receiving said first and second control signals, said input signal means connected to said bus;
    address decode means for decoding said address signals, said address decode means connected to said bus;
    data convert means for converting said PCM data stream from a serial format to a parallel format, said data convert means connected to said bus;
    processor means for monitoring said PCM data stream, said processor means operatively connected to said input signal means, to said address decode means and to said data convert means, said processor means outputting a code signal indicative of tones and voice energy in said PCM data stream, said processor means responsive to said first and second control signals and utilizing said address signals to monitor said PCM data stream;

output signal means for transmitting at least first and second response signals to said automatic call distribution system, said output signal means connected to at least said processor means and to said bus.

2. The answer detector described in claim 1 wherein said answer detector further comprises I/O controller means for routing internal signals between said processor means and said input signal means, said data convert means and said output signal means.

3. The answer detector described in claim 1 wherein said answer detector further comprises interrupt controller means for providing an interrupt signal to said processor means, said interrupt controller means connected at least to said address decode means and to said processor means.

4. The answer detector described in claim 1 wherein said input signal means comprises:
   means for receiving said first and second control signals and connected to said bus;
   and means for latching said received first and second control signals and connected to said means for receiving for receiving.

5. The answer detector described in claim 1 wherein said data convert means comprises:
   means for receiving said PCM data stream and connected to said bus, said means for receiving converting said PCM data stream from a serial format to a parallel format;
   and means for latching said PCM data stream in said parallel format, said means for latching connected to said means for receiving.

6. A method of monitoring a telephonic PCM data stream for tone and voice energy and for use in an answer detector comprising:
   (a) providing an enable signal to said answer detector to initialize the answer detector;
   (b) providing at least first and second control signals, address signals and PCM data stream to said answer detector;
   (c) seizing said answer detector;
   (d) identifying predetermined values of said first and second control signals;
   (e) connecting said answer detector to a trunk line;
   (f) detecting tone or voice energy in said PCM data stream;
   (g) transmitting on said trunk line at least a first and second predetermined response signal representative of said detected tone or voice energy; and
   (h) disconnecting said trunk line and placing said answer detector in an idle state and proceeding to step (b).

7. The method described in claim 6 wherein said method further comprises in step (g) verifying said transmission of said first and second response signals for a predetermined time.

8. The method described in claim 6 wherein said method further comprises in step (d):
   (d) identifying a second set of predetermined values and proceeding to step (i);
   (i) testing said answer detector for proper operation and if no errors are identified returning to step (a) or;
   (j) taking said answer detector out of service.

9. The method described in claim 6 wherein said method further comprises in step (d) identifying a third set of predetermined values and proceeding to step (a) to reinitialize said answer detector.

10. The method described in claim 6 wherein step (f), detecting tone or voice energy in said PCM data stream, comprises:
   (1) detecting voice or tritone signals, or going to step (4) if detecting a first different signal;
   (2) if voice or tritone signals are detected, waiting a first predetermined time interval;
   (3) identifying the voice signal or the tritone signal and setting said first and second response signals indicative of said identified signal and going to step (g);
   (4) determining when said first different signal in said PCM data stream is one and is off;
   (5) detecting said first different signal as a busy tone signal or reorder tone signal or going to step (7) if detecting a second different signal;
   (6) checking cadence to identify a busy tone signal or a reorder tone siganl and setting said first and second response signals indicative of said identified signal and going to step (g); and
   (7) identifying a plurality of tone signals in said second different signal and setting said first and second response signals indicative of said identified signal and going to step (g).

* * * * *